US008238984B2

(12) United States Patent
Pursche et al.

(10) Patent No.: US 8,238,984 B2
(45) Date of Patent: Aug. 7, 2012

(54) DEVICE FOR COUPLING AND HOUSING A MOBILE TELEPHONE IN A MOTOR VEHICLE

(75) Inventors: Udo Pursche, Berlin (DE); Michael Fenske, Seddiner See OT Neuseddin (DE); Ronald Heldt, Gross Machnow (DE); Raimo Jacobi, Berlin (DE); Thomas Bartsch, Zossen OT Dabendorf (DE)

(73) Assignee: Funkwerk Dabendorf GmbH, Dabendorf (DE)

( * ) Notice: Subject to any disclaimer, the term of this patent is extended or adjusted under 35 U.S.C. 154(b) by 389 days.

(21) Appl. No.: 12/296,478

(22) PCT Filed: Apr. 5, 2007

(86) PCT No.: PCT/EP2007/003328
§ 371 (c)(1),
(2), (4) Date: Apr. 9, 2009

(87) PCT Pub. No.: WO2007/118694
PCT Pub. Date: Oct. 25, 2007

(65) Prior Publication Data
US 2009/0305746 A1 Dec. 10, 2009

(30) Foreign Application Priority Data

Apr. 12, 2006 (DE) .................. 10 2006 017 661
Jul. 20, 2006 (DE) .................. 10 2006 034 128

(51) Int. Cl.
*H04M 1/00* (2006.01)
(52) U.S. Cl. ............... 455/575.1; 455/569.1; 455/569.2
(58) Field of Classification Search ............... 455/575.1, 455/569.1, 569.2
See application file for complete search history.

(56) References Cited

U.S. PATENT DOCUMENTS

| | | | |
|---|---|---|---|
| 5,336,896 A | 8/1994 | Katz | |
| 5,493,702 A | 2/1996 | Crowley et al. | |
| 5,512,910 A | 4/1996 | Murakami et al. | |
| 5,621,422 A | 4/1997 | Wang | |
| 5,974,333 A | 10/1999 | Chen | |
| 6,259,407 B1 | 7/2001 | Tran | |
| 6,317,089 B1 | 11/2001 | Wilson et al. | |
| 6,756,697 B2 | 6/2004 | Mizutani et al. | |
| 6,942,267 B1 * | 9/2005 | Sturt ......................... 296/24.34 |

(Continued)

FOREIGN PATENT DOCUMENTS

DE   9311242 U1   10/1993

(Continued)

*Primary Examiner* — Barry Taylor
(74) *Attorney, Agent, or Firm* — Laurence A. Greenberg; Werner H. Stemer; Ralph E. Locher

(57) ABSTRACT

A system for accommodating a mobile telephone in a compartment in a motor vehicle. The compartment is electromagnetically shielded against the emission of radio signals from the mobile telephone. The system includes a connector for transmitting an antenna signal from an antenna of the motor vehicle to the mobile telephone, an electromagnetically shielded housing with an opening for inserting the mobile telephone into the housing and for removing the mobile telephone from the housing, and an elastically deformable retaining element that is designed to be electromagnetically absorbing. In a closed state of the housing in which the opening of the housing is at least partially closed, the opening at least partially shields against the emission of radio signals of the mobile telephone from the housing. In the closed state the retaining element secures the mobile telephone in a temporary position.

8 Claims, 12 Drawing Sheets

U.S. PATENT DOCUMENTS

| | | |
|---|---|---|
| 7,068,783 B2 | 6/2006 | Peiker |
| 2003/0058168 A1 | 3/2003 | Sadler et al. |
| 2004/0072558 A1* | 4/2004 | Van Bosch ............... 455/417 |
| 2004/0087335 A1 | 5/2004 | Peiker |
| 2004/0116084 A1 | 6/2004 | Ward et al. |
| 2004/0233114 A1 | 11/2004 | Holzmann et al. |
| 2005/0001780 A1* | 1/2005 | Aisenbrey ............... 343/873 |
| 2006/0193740 A1 | 8/2006 | Kamath et al. |
| 2007/0008233 A1* | 1/2007 | Strauss et al. ............ 343/713 |
| 2007/0178754 A1* | 8/2007 | Schlegel et al. ............ 439/527 |
| 2008/0303725 A1 | 12/2008 | Hackenbroich et al. |

FOREIGN PATENT DOCUMENTS

| | | |
|---|---|---|
| DE | 29623159 U1 | 3/1998 |
| DE | 19707318 A1 | 8/1998 |
| DE | 19717834 A1 | 10/1998 |
| DE | 19746161 A1 | 4/1999 |
| DE | 11227536 A | 8/1999 |
| DE | 19921533 C1 | 1/2001 |
| DE | 19953648 A1 | 5/2001 |
| DE | 10008751 A1 | 9/2001 |
| DE | 10037241 A1 | 2/2002 |
| DE | 10201612 A1 | 7/2002 |
| DE | 10123556 A1 | 12/2002 |
| DE | 20306910 U1 | 8/2003 |
| DE | 10321429 A1 | 12/2003 |
| DE | 10360109 A1 | 7/2004 |
| DE | 10313625 A1 | 10/2004 |
| DE | 10318296 B3 | 1/2005 |
| DE | 10351703 A1 | 6/2005 |
| DE | 10356087 A1 | 6/2005 |
| DE | 10356495 A1 | 7/2005 |
| DE | 102004033009 A1 | 9/2005 |
| DE | 102005053580 A1 | 5/2007 |
| EP | 0420504 A2 | 4/1991 |
| EP | 1052834 A2 | 11/2000 |
| EP | 1489682 A1 | 12/2004 |
| EP | 1528623 A1 | 5/2005 |
| EP | 1600333 A1 | 11/2005 |
| GB | 2324657 A | 10/1998 |
| GB | 2414121 A | 11/2005 |
| JP | 10215305 A | 8/1998 |
| JP | 2004354171 A | 12/2004 |
| WO | 9717792 A1 | 5/1997 |
| WO | 9913527 A1 | 3/1999 |
| WO | 2004095634 A2 | 11/2001 |
| WO | 2005046190 A1 | 5/2005 |
| WO | 2005055452 A1 | 6/2005 |

* cited by examiner

DEVICE FOR COUPLING AND HOUSING A MOBILE TELEPHONE IN A MOTOR VEHICLE

BACKGROUND OF THE INVENTION

Field of the Invention

The invention relates to an arrangement for coupling a mobile telephone to devices of a motor vehicle, and in particular for holding the mobile telephone within the motor vehicle. The invention also relates to a method for coupling and arrangement of the mobile telephone in the motor vehicle. The expression a mobile telephone means an appliance which can communicate via a radio interface with a remote station while it is moving. The appliance need not necessarily have a keypad and need not necessarily be suitable both for transmission operation and reception operation. For example, the mobile telephone may be a mobile emergency transmitter which sends an emergency signal to the station when a button is pressed.

Numerous holders are already known by means of which a mobile telephone can be held at a desired point within a motor vehicle. Connections for electrical connection of the mobile telephone to a hands-free installation and/or to an antenna of the motor vehicle are generally integrated in the holders. However, it is also known that the mobile telephone can be connected via a Bluetooth radio interface to the hands-free installation installed in the motor vehicle.

However, in general, the holders are suitable for only one specific type of mobile telephone. If it is intended to hold a different type of mobile telephone, a new holder or at least a new adaptor is generally required.

BRIEF SUMMARY OF THE INVENTION

One object of the present invention is to specify an arrangement which is suitable for holding a multiplicity of different mobile telephone types. A further aim is preferably to shield the interior of the motor vehicle from radio signals which the mobile telephone emits.

One aspect of the invention is based on the idea of the mobile telephone being coupled wirelessly to an antenna structure of the motor vehicle. The antenna structure can be connected (for example via a coaxial cable) to an external antenna of the motor vehicle. In this way, radio signals which are emitted by the mobile telephone can be received by the antenna structure in the interior of the motor vehicle, can be passed via the connection to the external antenna of the motor vehicle, and can be emitted by this external antenna. In this case, it is optionally also possible for the signals to be changed and/or processed after their reception by the antenna structure, but before transmission via the external antenna. In particular, in this case, additional information can be added to the information to be transmitted, and/or it is possible to change to a different data format and/or transmission protocol. Transversely, the coupling of the mobile telephone to the antenna structure allows reception of signals which are first of all received by the external antenna, are transmitted via the connection between the external antenna and the antenna structure to the antenna structure, and are transmitted wirelessly by the antenna structure to the receiving antenna of the mobile telephone, in which case the transmitting and receiving antenna of the mobile telephone may also be a single antenna. In a corresponding manner, as described for transmission signals, the information contained in the received signals can be processed and/or changed after reception of the received signals by the external antenna but before the transmission from the antenna structure to the receiving antenna of the mobile telephone.

A device is preferably provided which restricts the local area in which the mobile telephone may be located during operation via the antenna structure. In the case of a standard holder (cradle) for a mobile telephone, a single fixed position can be defined in which the mobile telephone is located when it is held by the holder. In this case, the same holder may be suitable for holding different mobile telephone types, and the positions which the various mobile telephone types assume in the held position may vary from type to type.

However, according to the invention, it is also possible for a holder to be able to hold the same mobile telephone type in different positions and/or (within a specific local area) in any given positions. In this case, the antenna structure is arranged relative to the holder such that wireless signal transmission can take place in every possible held position (this also includes different rotation positions, that is to say orientations, of the mobile telephone) between the antenna or antennas of the mobile telephone and the antenna structure.

In this case, the antenna of the mobile telephone, or the antennas of the mobile telephone, is or are preferably located in the near field of the antenna structure and/or the antenna structure is located in the near field of the antenna or of the antennas of the mobile telephone. The distance between the antenna or the antennas of the mobile telephone and the antenna structure is therefore, for example, at most 15 cm, in particular at most 10 cm, and preferably at most 5 cm. This makes it possible to achieve low coupling losses for the coupling of the mobile telephone to the antenna structure.

The expression a holder for a mobile telephone also means, for example, the housing which will be described in the following text, with a fixing element. The expression a holder furthermore also means that the holder restricts only the movement capabilities of the mobile telephone, but does not hold the mobile telephone fixed in an immovable position. By way of example, the holder may therefore have a shell which is lined with a cushioning material, into which the mobile telephone is inserted and is then preferably located in the near field of the antenna structure.

The antenna structure and the holder may form a common physical unit, or may be part of a common physical unit. The expression a physical unit means that the parts of the unit are mechanically connected to one another and can thus be installed in the motor vehicle in a single process.

However, it is also possible to install the antenna structure and the holder in the motor vehicle as separate parts which are not mechanically connected to one another, such that they are mechanically connected to one another only by the installation. For example, the holder may be installed in a predefined area on that surface of a front face of the interior which points towards the interior of the motor vehicle. In this case, for example, it is possible to choose between different holders which are each designed for one or more specific mobile telephone types. However, the antenna structure can also be installed on an opposite side of the surface (that is to say of the wall) of the vehicle interior, and can be arranged for coupling to the antenna or antennas of the mobile telephone irrespective of which holder is arranged in the vehicle interior, and can also function during operation. For example, the antenna structure is mounted on the side of a so-called dashboard which points towards the engine compartment of a road vehicle with an engine at the front. The antenna structure therefore cannot be seen from the vehicle interior. However, in the area provided for this purpose in the vehicle interior, which is located at the same point on the dashboard on which the antenna structure is also mounted, but is separated from the antenna structure by the material of the dashboard, a suitable holder can then be installed for a specific mobile telephone, for a plurality of specific mobile telephone types, or a universal holder can be installed for virtually any desired mobile telephone types. In this case, the antennas of the mobile telephone and the antenna structure are preferably located, as described above, in the near field when the respective mobile telephone is held by the holder.

One major advantage of this procedure is that an antenna structure which can be produced at relatively low cost can be installed fixed in the motor vehicle, but it can then be left up to the respective vehicle keeper whether and which mobile telephone he wishes to couple to the antenna structure. The effort for retrospective installation of the holder is relatively low. In particular, the antenna structure can be galvanically connected right from the start to the external antenna of the motor vehicle, for example via a coaxial cable.

In this case, it is even possible for the holder of the mobile telephone and/or the mobile telephone to have no galvanic connection to other devices in the motor vehicle whatsoever during operation within the motor vehicle. The signal transmission which is required for operation of the mobile telephone can be provided solely via the antenna structure, or via a plurality of antenna structures. In this case, it is not just possible, as described in more detail elsewhere in this description, for the actual transmission and/or received signals of the mobile telephone to be transmitted wirelessly, but also control signals and/or signals which are transmitted for coupling the mobile telephone to a hands-free device of the motor vehicle, that is to say for example signals of a microphone and/or loudspeaker which are or is installed in the motor vehicle.

DE 103 13 625 A1 discloses a holding apparatus for a mobile radio with holding means for fixing the mobile radio with a predetermined held position and with a coupling antenna which is designed and arranged such that, when the mobile radio is located in the held position, there is a wireless coupling between a mobile radio antenna of the mobile radio and the coupling antenna. In order to provide protection against risks to the health of people located in the vicinity of the holding apparatus, the transmission power of the wireless coupling is kept low, and an amplifier element is also provided which amplifies signals in a transmission line to an external antenna of a motor vehicle.

One object of one aspect of the invention which is described in the following text, which can be implemented in its own right or can be implemented in any desired combination with the other aspects described in this description, is to specify an arrangement for coupling a mobile telephone antenna to devices of a motor vehicle extending the capabilities for use of the mobile telephone.

It is proposed that the antenna structure for wireless transmission of signals to and/or from the transmitting and/or receiving antenna of the mobile telephone be designed such that the antenna structure has a broad bandwidth. In particular, the antenna structure is designed to transmit and/or to receive the signals in a frequency range which includes the frequency bands of at least two different mobile radio networks and/or at least one mobile radio network and a further frequency band. For example, the frequency bands are the frequency bands of two different GSM networks, one GSM network and one UMTS network, two or more UMTS networks or one mobile radio network and the frequency band according to the Bluetooth Standard.

The antenna structure (which may also be a physically distributed antenna structure) preferably has the characteristics which are described in the following text.

It is preferable for the dimensions (in particular the length and/or width) of electrically conductive areas (that is to say antennas) which form the antenna structure to be in the order of magnitude of 10 cm. This means that the length and/or width for different embodiments of the antenna structure may, for example, be down to 1 cm and/or for example, up to 1 m. The frequencies at which the radio signals are transmitted within a mobile telephone network are nowadays normally in the range from about 450 MHz (GSM, Global System for Mobile Communication in Tanzania) to 2200 MHz (UMTS, Universal Mobile Telecommunications System). Even higher signal frequencies are possible for future mobile radio networks (for example WLAN networks). The transmission frequencies for signals according to the Bluetooth Standard are in the range from 2400 to 2500 MHz.

The preferred embodiment of the antenna structure is intended to be suitable for reception and/or for transmission in a plurality of the frequency bands, preferably in all the frequency bands, of said systems, at least in the frequency range from 850 MHz to 2500 MHz. It is thus possible not only to transmit the signals for operation of the mobile telephone in a mobile radio network but also to transmit signals for operation in a different mobile radio network and/or according to the Bluetooth Standard. For example, according to the Bluetooth Standard, control signals can be transmitted in order to control the operation of the mobile telephone (for example dialing of a subscriber number by voice signals or operation of a keypad at a different point than on the mobile telephone), and/or signals in the hands-free mode.

The antenna structure is preferably designed such that it can transmit and/or receive frequency signals over a broad bandwidth in a frequency band. It is also possible for the antenna structure to have a plurality of frequency bands in which it can transmit and/or receive over a broad bandwidth, in which case the frequency ranges may be separate from one another or may overlap one another. Each frequency band or the entire frequency range is limited by an upper cut-off frequency and a lower cut-off frequency. The expression broad bandwidth means that, within the frequency range between the upper cut-off frequency fo and the lower cut-off frequency fu the ripple factor s or the standing wave ratio VSWR, which is determined from the amplitudes of the waves which propagate towards the antenna from the antenna supply line (amplitude Uh) and propagate back from the antenna into the antenna supply line (amplitude Ur) does not exceed a factor of 2 with respect to one octave, that is to say $$VSWR <= 2 \text{ if } fo/fu=2, \text{ where}$$

$$VSWR = s = (Uh+Ur)/(Uh-Ur)$$

It is therefore preferable for the antenna structure in this sense to have a broad bandwidth for reception and/or transmission of signals in the previously mentioned frequency ranges for GSM, UMTS, a future WLAN mobile radio network and/or for Bluetooth.

The antenna structure may be any desired broadband antenna structure which is known or still unknown from antenna technology. In particular, the antenna structure may
- be similar within itself,
- be self-complementary,
- have a shape which remains unchanged if the scale changes,
- and/or have a plurality of resonant elements in which case the dimensions of the resonant elements with respect to one another behave in the same way as the elements in a geometric series.

An antenna structure is similar within itself when electrically conductive and/or non-conductive areas of the antenna structure have shapes (but not necessarily their size as well) which are similar to or the same as one another. Structures which are similar within themselves may be fractals. In particular, fractals are known from chaos theory. For example, the antenna structure has a multiplicity of different physical regions in which electrically conductive areas of the same shape are arranged as in the other regions.

An antenna structure is self-complementary when the size and shape of electrically conductive areas of the antenna structure are the same as the size and shape of electrically non-conductive areas in the physical region (in the case of two-dimensional structures on the surface) of the antenna structure. One example is a two-dimensional antenna structure in which boundary lines between electrically conductive and non-conductive areas of the structure extend linearly, that is to say in the form of rays, from a center of the antenna structure, in which case the triangular electrically conductive and non-conductive areas formed (in the area of the center) in this way are of equal size, that is to say in particular they cover angular ranges of the same size.

An antenna structure has a shape which remains unchanged when the scale changes when structure elements of the antenna structure which are of the same size normalized with respect to the signal frequency are provided for different signal frequencies (for which the antenna structure has a broad bandwidth). An example is a spiral antenna. An area of the antenna structure which is located close to the center of the spiral is of precisely the same size and shape for a low signal frequency as an area of the spiral antenna structure located further outwards for a higher signal frequency.

For example, the electrically conductive areas of the antenna structure may extend on a plane along a surface of a mount in the form of a plate, as a result of which the antenna structure is essentially suitable for reception and/or for transmission of signals in directions transversely with respect to the surface. By way of example, the mount may be a board as known from electrical engineering, on whose surface the desired electrically conductive areas of the antenna structure are produced by structuring techniques which are known per se. The electrical connection to the antenna supply line can then advantageously be made on the rear face of the board or of the mount.

One example of a situation in which the dimensions of the resonant elements (that is to say the structure elements of an antenna structure) behave with respect to one another in the same way as the elements of a geometric series will be described in the following text: if, for example, a resonant element has the length L0 then the next smaller element has the length t×L0, the third t×2L0 etc, in which case t is also referred to as the step factor:

$$Ln = L0 \times t^n,$$

where n is a natural number.

One preferred refinement of a holder for mobile telephones is based on the idea that an electromagnetically shielding housing which, for example, is permanently installed in the interior of the motor vehicle is intended to be able to hold mobile telephones with different external dimensions, in which case the handling of the processes of insertion of the mobile telephone into the housing and removal of the mobile telephone from the housing are intended to be designed to be as simple as possible for the user. In this case, an antenna structure can also be used for wireless transmission of the signals between the mobile telephone antenna and devices in the vehicle. However, it is also possible for the mobile telephone to be coupled in a different manner to the devices, for example via a plug connection to the mobile telephone.

An opening which the housing must necessarily have for insertion and removal of the mobile telephone may be at least partially closed by an elastically deformable element. In this case, the elastically deformable element is on the one hand designed as a fixing element which mechanically fixes the mobile telephone in an instantaneous position when the opening is in the closed state and/or when the housing is in the closed state. On the other hand, the fixing element is designed to be electromagnetically absorbent.

The expressions electromagnetically absorbent and/or electromagnetically shielding are used in this description to mean that electromagnetic waves which wish to pass through the fixing element or the housing parts have their amplitude significantly attenuated. In one particular refinement, the electromagnetic shielding is designed specifically for one or more of the frequency bands in which mobile telephones transmit and/or receive their radio signals. These may be those frequency bands which are used within a mobile telephone network, and/or the frequency bands for an additional radio interface, for example according to the Bluetooth Standard.

Since an elastically deformable fixing element (or else a plurality of them) is used, the mobile telephone does not need to be arranged at a specific, predefined position within the housing. In fact, the mobile telephone can be inserted into the housing in any desired manner, and the fixing element can be used to fix the mobile telephone in the desired position which it currently assumes.

Optionally, other parts of the housing are also specifically designed to fix the mobile telephone in its desired instantaneous position, at least when the at least one fixing element also rests on the mobile telephone and holds it firmly. For example, the housing may be entirely or partially lined with materials which prevent, or at least make it harder, for the mobile telephone to slide out of position. In one specific refinement, at least a part of the housing is provided internally with a foam material on which the mobile telephone can be placed and/or against which the mobile telephone can be pressed, in such a way that the foam material is elastically deformed by the mobile telephone when in the fixed position. The elastic opposing forces then fix the mobile telephone, or at least make it harder to change the instantaneous position of the mobile telephone. The foam material also has a damping effect for shocks which act on the mobile telephone from the housing.

It is preferable for the fixing element to also have a foam material in which a substance or a substance mixture is preferably distributed which has electromagnetically absorbent characteristics.

Furthermore, the arrangement with the housing has at least one connection for transmission of an antenna signal from an antenna of the motor vehicle to the mobile telephone, and/or vice versa. In this way, the mobile telephone can be operated via the vehicle antenna while it is arranged in the housing.

Further interfaces are preferably provided between the mobile telephone and devices in the motor vehicle, for example a Bluetooth interface, for example in order to allow the mobile telephone to be connected to a hands-free device in the motor vehicle.

In one preferred refinement, the connection for transmission of the antenna signal is connected via an electrical line (for example a coaxial cable) to an antenna structure in the interior of the housing. The antenna structure makes it possible to wirelessly transmit the antenna signals to be interchanged between it and the mobile telephone. There is therefore no need for any mechanical-electrical connection of the mobile telephone to the antenna connection of the arrangement. For example, the user then does not need to connect an antenna plug, which is associated with the housing, to the mobile telephone when he inserts the mobile telephone into the housing.

The expression fixing of the mobile telephone in an instantaneous position means, in particular, that the fixing element rests on the mobile telephone during fixing and is elastically deformed in the process, such that the opposing force which counteracts the elastic deformation acts on the mobile telephone such that the mobile telephone is fixed. However, the word fixing should not necessarily be understood as meaning rigid fixing. In fact, for example, the mobile telephone can move away from its instantaneous position as a result of external forces, despite the fixing. In particular, for example when the motor vehicle is being braked, the mobile telephone may be moved temporarily or permanently by virtue of its inertia. However, the movement is preferably only temporary and is sprung by the fixing element and/or by other elastic components of the arrangement.

According to one further aspect, which will be described in this description, an arrangement has a holder for holding the mobile telephone in an instantaneous position. In this case, the holder may be part of a housing in which the mobile telephone is intended to be held, or may also be arranged outside a housing. Provision can be made for the mobile telephone antenna to be coupled to devices in a motor vehicle.

The word "holding" can also be understood as meaning a contribution to the fixing of the mobile telephone in an instantaneous position. Overall, the mobile telephone may, for example, be fixed by being held by the holder and additionally being fixed by the fixing element described above.

The holder is preferably designed to hold the mobile telephone with an interlock and/or force fit. In particular, the holder can be designed to alternatively hold a different mobile telephone, with different external dimensions, with an interlock and/or a force fit. For example, the configuration of the holder can be used to define a plurality of different positions in each of which one of a plurality of mobile telephones with different external dimensions is held by the holder with an interlock and/or a force fit. In this case, with one specific configuration of the holder, it is only possible to hold one of the plurality of mobile telephones with different external dimensions.

The expression "different positions" also includes the situation in which only the alignment of the respectively held mobile telephones differs when a first position is compared with a second position.

By way of example, this makes it possible to insert different mobile telephones optionally into a housing and for them to be connected to the antenna of the motor vehicle via the connection for transmission of the antenna signal, for example a PDA (personal digital assistant) and, optionally, a standard mobile telephone with small external dimensions.

A user can therefore in each case select one of the different positions which is particularly highly suitable for the mobile telephone to be held. Trials have shown that users learn very quickly which position is best suitable for a specific mobile telephone, and can also remember this position well.

In one specific refinement, the holder may have a holding area, in the form of a trough, for holding the mobile telephone, which is bounded by a base and a circumferential side edge surface, which is intrinsically closed. A holding area in the form of a trough such as this can be designed in various ways such that it provides the various positions for mobile telephones with different dimensions.

In particular, the edge surface may have a plurality of projections which, for example, are formed by an elastic material. These projections in their own right allow a plurality of different positions. For example, a mobile telephone can be inserted into the holding area which is in the form of a trough such that it rests on either one side or the other of one of the projections and/or is arranged between any desired pairs of projections or between any desired combinations of projections, and is held at least by these projections, that is to say it rests on these projections.

Alternatively or additionally, the edge surface may have one or more cutouts and/or depressions.

The words a projection, a depression and a cutout in each case mean an area (either a material area or an area which is free of material) which interrupts a continuous profile of the edge surface. The continuous profile of the edge surface may be a linear profile or a continuous curved profile. The word "profile" means in particular the profile of the edge surface around the holding area.

The edge surface and/or the base are/is preferably formed by an elastic material. A thermoplastic elastomer (TPE) is particularly highly suitable. The material which forms the base and the edge surface, and optionally the projections as well, may be a single piece of material which, for example, has been produced as a molding using a negative mold.

In one preferred embodiment, the edge surface has at least one concave section and one convex section along its profile around the holding area. The expression a convex section means a section where the holding area curves outwards, while a concave section means a section where the holding area is "reduced in size" inwards in comparison to the situation in which the edge surface has a continuous linear profile in that section.

However, the word curvature also means that the section of the edge surface has one or more corners on which the edge surface bends around the holding area along its profile. For example, a convex section corresponds to a profile with an external corner in which the internal angle of the corner, measured in the holding area, is between 0 and 180°. By way of example, a concave section corresponds to an internal corner at which the internal angle, measured in the holding area, is greater than 180°.

The embodiment as described above with at least one concave section and one convex section therefore corresponds, for example, to a profile of the edge surface around the holding area with at least one internal corner at which the material which forms the edge surface projects into the holding area.

In the at least one convex section, the edge surface preferably runs along a spiral line around an imaginary center point within the holding area. The expression a spiral line means a line whose radius from the center point increases continuously along its profile with respect to the center point, with the rotation angle around the center point in this case at the same time either increasing (spiral in the counterclockwise direction) or decreasing (spiral in the clockwise direction) continuously. However, the expression a profile of the edge surface along a spiral line also means that the edge surface does not follow the spiral line exactly but, for example, repeatedly intersects it. An exemplary embodiment such as this in which the edge surface has sections which run in a straight line and with external corners will be described in more detail below.

The invention also covers a method for arrangement of a mobile telephone in an electromagnetically shielded area within a motor vehicle.

Preferred embodiments and further features, which may optionally be present in addition to the already mentioned features, will now be described with reference to the attached drawing. In the individual figures of the drawing:

DESCRIPTION OF THE INVENTION

Figure 1:
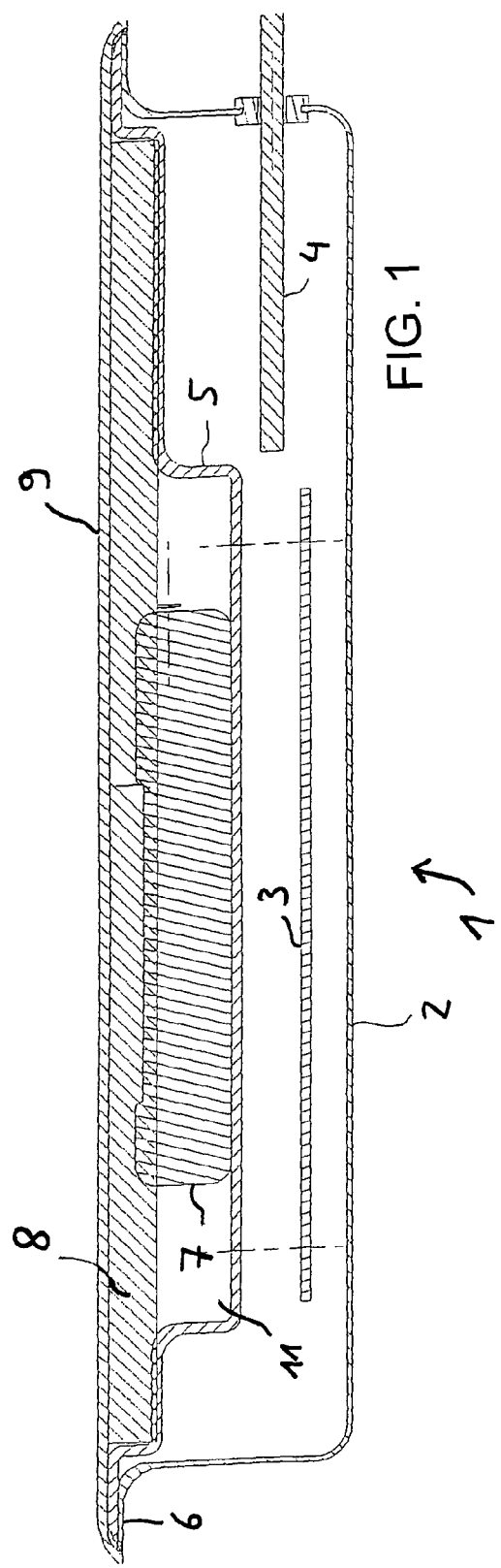
FIG. 1 shows a vertical longitudinal section through a housing with a mobile telephone arranged in it.
Figure 2:
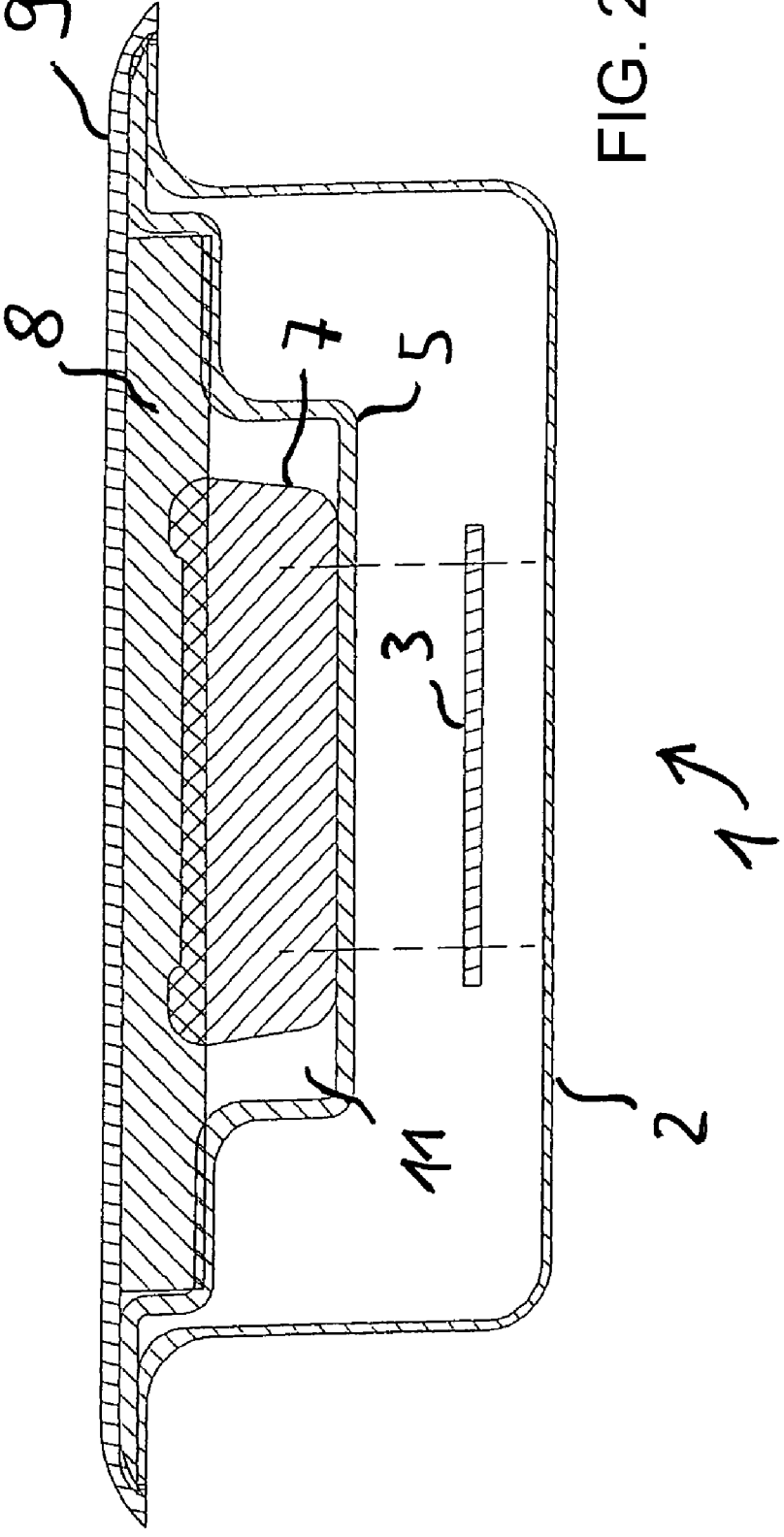
FIG. 2 shows a vertical cross section through the arrangement shown in FIG. 1.

As is shown in FIGS. 1 and 2, in one refinement of the arrangement according to the invention, a housing 1 can be provided which has a lower part 2 and a cover 9. The lower part 2 surrounds an internal area of the housing 1 on all sides, with the exception of the upper face. The lower part 2 is designed to be essentially cuboid, but has rounded corners and forms an upper edge 6 for an insert part 5, which is in the form of a trough, to rest on. The lower part 2 is manufactured, for example, from metal (and may optionally be connected to the motor vehicle ground potential), such that it attenuates electromagnetic waves which pass through the lower part 2, and/or such that electromagnetic waves cannot pass through the lower part 2. In both cases, a shielding effect is achieved.

The insert 5 which is in the form of a trough defines a partial internal area 11 in the interior of the housing 1, which is large enough in order to arrange one mobile telephone in each case therein, in which case the mobile telephone may be selected from a large number of different types, and in which case the external dimensions of the mobile telephones may vary in a wide range. In particular, the length, which extends from right to left in FIG. 1 of the mobile telephone 7 shown there does not fill the partial internal area 11. In particular, space would still be available for an antenna which projects upwards (that is to say pointing to the right in FIG. 1) on the mobile telephone 7 or on another mobile telephone. However the width of the mobile telephone extending from right to left in FIG. 2 does not fill the partial internal area 11 either. The contact surface of the insert 5 on which the mobile telephone 7 rests is preferably formed from non-slip material, preferably by a layer composed of soft plastic. Alternatively, for example, the contact surface is appropriately structured such that both the coefficient of static friction and the coefficient of sliding friction are high.

As shown both in the longitudinal section in FIG. 1 and in the cross section in FIG. 2, the insert 5 forms a shoulder, that is to say an area which is located at the side of the partial internal area 11, in which it extends approximately in the horizontal direction, above the level of the contact surface for the mobile telephone 7. The material of the insert 5 is then raised from this level to the level of the edge 6 of the lower part 2. When the housing 1 is in the closed state as illustrated in FIG. 1 and FIG. 2, a foam material panel 8 is placed on said intermediate level and can be attached to the lower face of the cover 9. The height or thickness of the foam material panel 8 is of such a size that it extends from the lower surface of the cover 9 to the intermediate level, where it rests on the shoulder of the insert 5. Furthermore, the height of the insert 5 in the area of the partial internal area 11 in which the mobile telephone 7 or other mobile telephones can be arranged is of such a size that the thickness, in the case of mobile telephones with a thickness in the normal range (the thickness is the dimension which extends in the vertical direction in FIG. 1 and FIG. 2) is greater than the height between the contact surface for the mobile telephone 7 and the upper edge of the shoulder. In this way, the mobile telephone projects beyond the level of the shoulder and thus presses the foam material panel 8 onto the mobile telephone when the cover 9 is closed, as can be seen in FIG. 1 and FIG. 2. The foam material of the foam material panel 8 is thus compressed (not illustrated in FIG. 1 and FIG. 2) and, because of the resultant elastic deformation, exerts a contact pressure force on the mobile telephone 7 which presses the mobile telephone, in addition to its weight force, onto the contact surface of the insert 5.

The foam material panel 8 is produced from a material which causes high dielectric losses when electromagnetic waves pass through it, in particular in the frequency ranges which are used by mobile telephones, as a result of which the waves are attenuated and a shielding effect is achieved. For example, carbon is distributed in the foam material and results in at least the major proportion of the dielectric losses. By way of example, the foam material may be polyurethane foam material.

Quite fundamentally, quite apart from the exemplary embodiment shown in FIG. 1 and FIG. 2, the electromagnetic shield which is formed by the housing and by the elastic material is not only used to attenuate and to shield the radio signals originating from the mobile telephone but also interference signals which could otherwise act on the mobile telephone. Interference signals such as these can also, for example, be produced by the motor vehicle itself or by devices within the motor vehicle.

Suitable foam materials with an electromagnetic shielding effect are marketed, for example, by Emc-Technik und Consulting GmbH, Emilienstraße 35, 70563 Stuttgart. By way of example, the homogeneous attenuation foam material offered by Emc GmbH under the designation C-RAM MT can be used for the exemplary embodiment shown in FIGS. 1 and 2. In one alternative refinement, a so-called pyramid absorber offered by Emc GmbH under the designation C-RAM SFC can also be used, which forms pyramid-shaped areas, which run to a point, on one side. This absorber also attenuates electromagnetic waves. The pyramid absorber has the advantage that it can project very much further from the lower face of the cover 9 or some other cover into the partial internal area in which the mobile telephone is held or is intended to be held. The pyramid tips can thus extend into the area which may possibly remain free between the mobile telephone and the edges of the trough which is formed by the insert part, and effectively prevent any movements of the mobile telephone. Since the pyramid tips can be pushed in the direction of the cover lower face with less force, the cover nevertheless rests well on the lower part of the housing. A pyramid absorber such as this may, however, also be used in other embodiments of a housing.

FIG. 1 and FIG. 2 do not illustrate the fact that the cover can also be articulated on the lower part 2, for example via a hinge.

Figure 7:
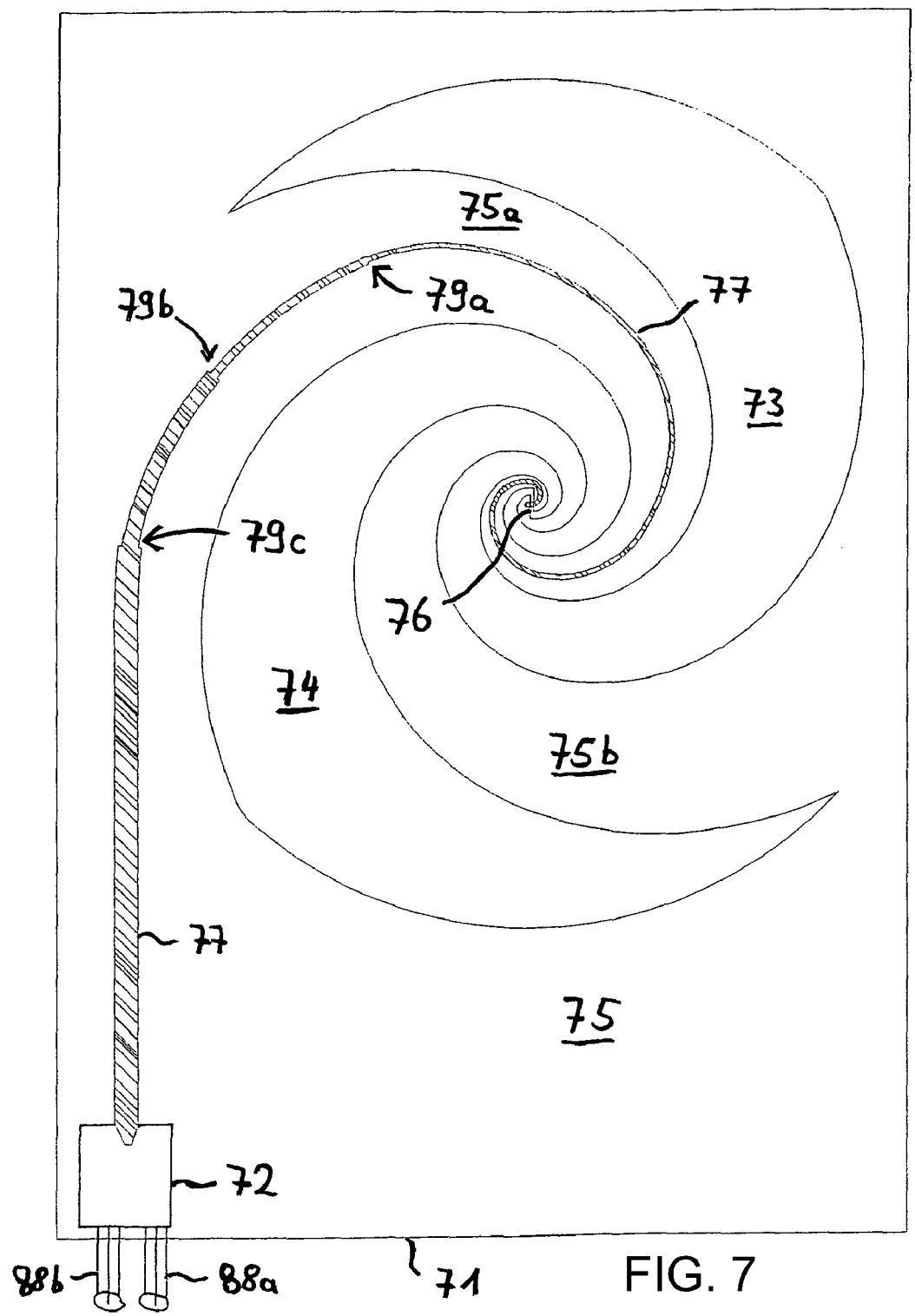
FIG. 7 shows a plan view of a front face of a mount which is fitted with an antenna structure.
Figure 8:
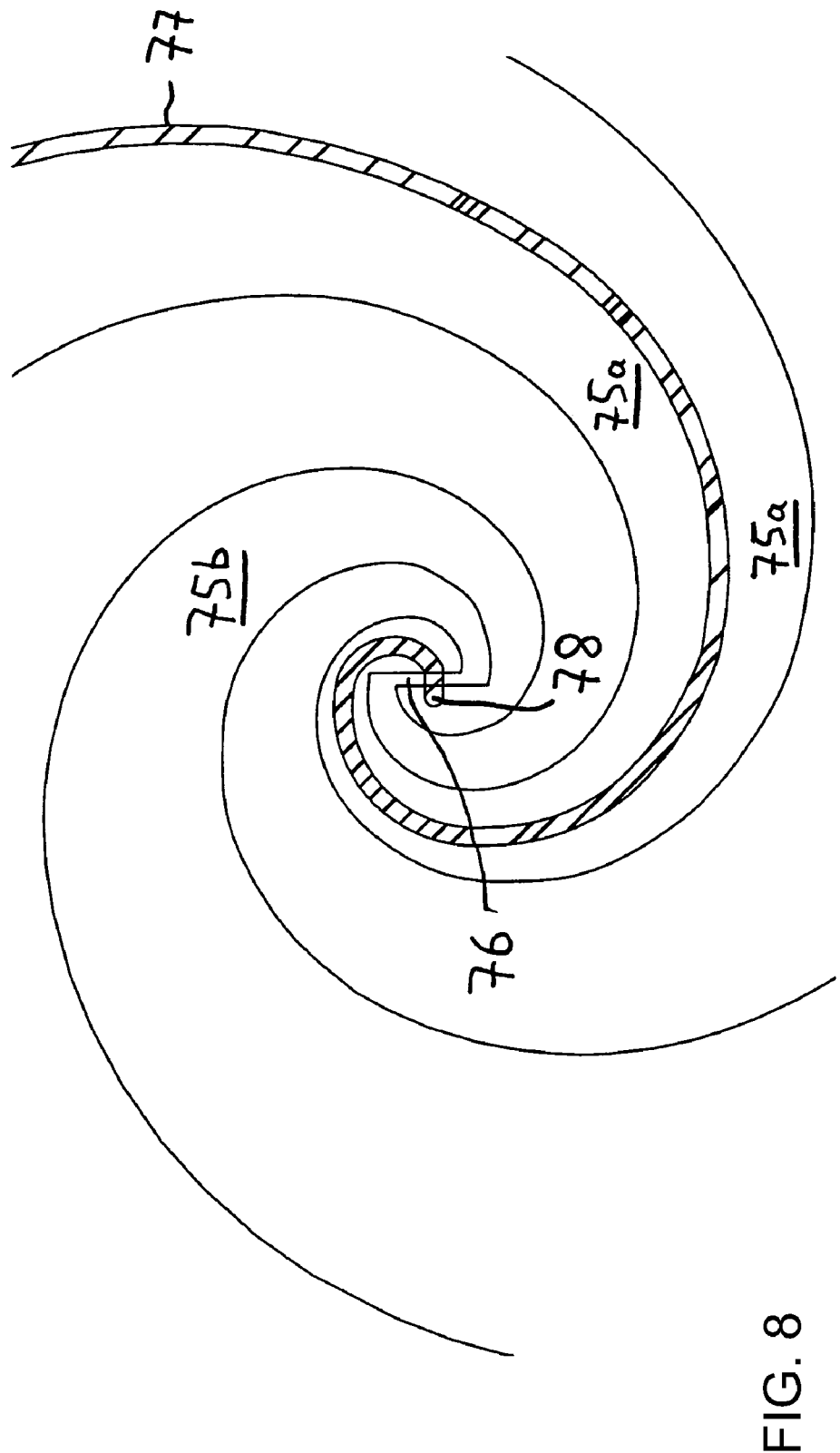
FIG. 8 shows a detail of the antenna structure illustrated in FIG. 7, at the center of the structure.

A board 3 is arranged in the intermediate space between the base of the lower part 2 and the partial internal area 11 (trough) in which the mobile telephone 7 is arranged. Electrical components and circuit elements as well as further devices can be formed on the board 3. Furthermore, another body to which such devices are fitted can be provided instead of a board. These devices may, in particular, carry out functions which are used for operation of the mobile telephone 7 or of another mobile telephone in the housing 1 or in another housing. In particular, it is preferable for it to be possible to use the mobile telephone within the housing. For this purpose, one of the devices on the board 3 or the other body is in the form of an antenna structure, such that radio signals can be transmitted between the antenna structure and the antenna of the mobile telephone. In particular, the board 3 may be the antenna structure as shown in FIGS. 7 and 8. The antenna structure is once again connected via a bushing 4 through the housing to the vehicle antenna. Further devices such as a compensator and/or a second antenna structure for a Bluetooth interface, can likewise be provided between the mobile telephone and the devices on the board 3 or the other body. For example, the mobile telephone can thus be connected via the Bluetooth interface in a manner known per se to a hands-free device in the motor vehicle with at least one loudspeaker and with at least one microphone.

However, it is also possible to arrange only a single antenna structure in the housing, which can be designed to have a broad bandwidth (that is to say can receive signals within a frequency range with a broad bandwidth from the mobile telephone and/or can send them to the mobile telephone), for example the antenna structure, which will be described later with reference to a further figure. In this case, the antenna structure may have a single antenna or a plurality of individual antennas. The broadband frequency range comprises, for example, both the signal frequency ranges in which the signals of a mobile telephone network are transmitted (in particular between a mobile telephone and a fixed-position base station in the network) and in which signals are transmitted in order to control the mobile telephone operation and/or in order to couple the mobile telephone to a hands-free device in the motor vehicle (for example according to the Bluetooth Standard).

The word a compensator means a circuit arrangement in order to compensate for attenuation losses which occur in an antenna line, for example as described in DE 10114531. In addition, the mobile telephone can be operated with a hands-free device such as this, for example via a speech dialogue and/or via a keypad in the interior of the motor vehicle.

Figure 3:
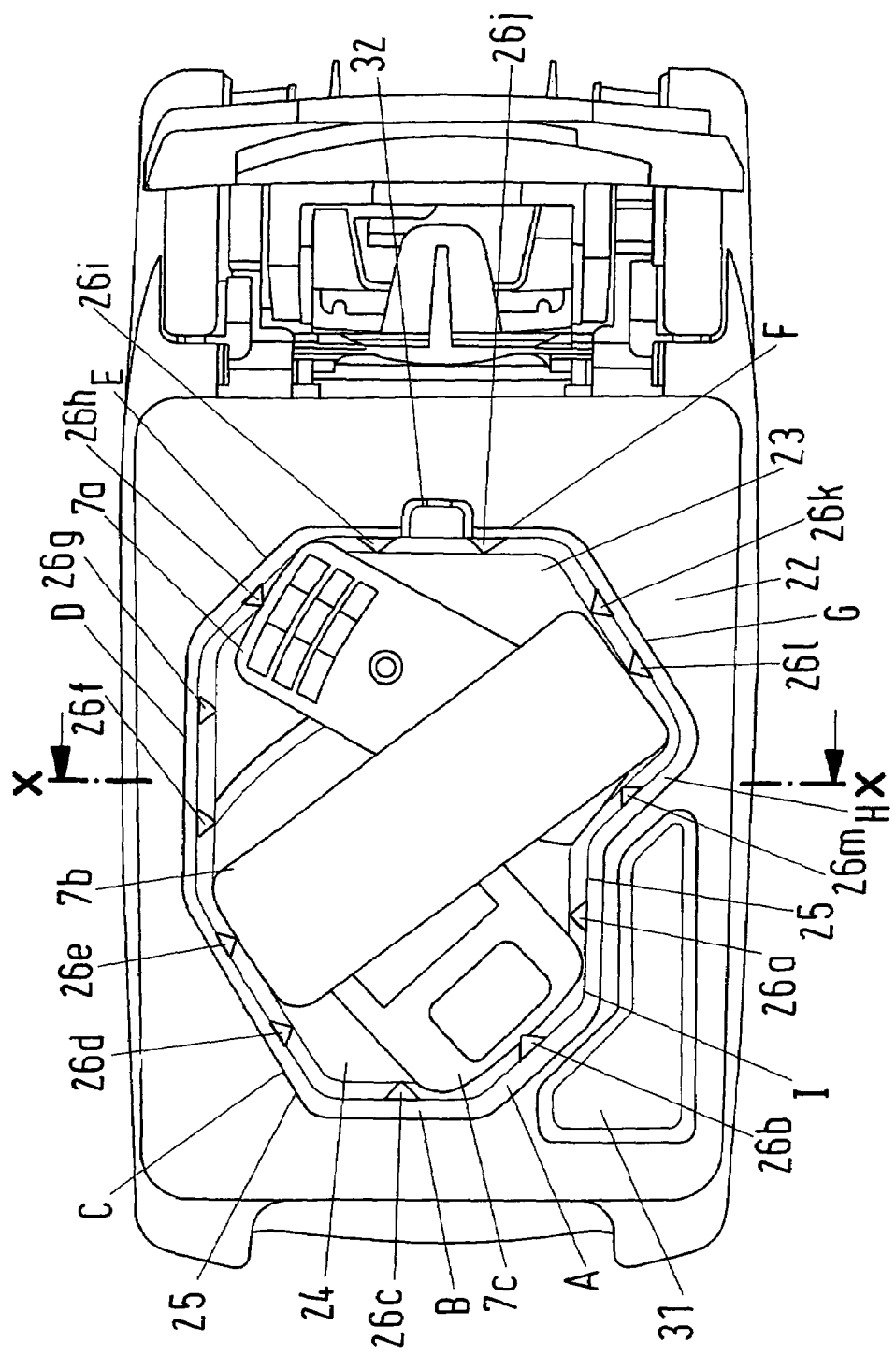
FIG. 3 shows a view from above of a holding area, which is in the form of a trough, for optionally holding mobile telephones with different dimensions.

FIG. 3 shows the lower part of a housing which is designed to provide electromagnetic shielding. The housing has a hard lower shell, which is manufactured from essentially inelastic material and is formed, for example, from plastic. The lower shell has a holding area 23 in the form of a trough in order to hold a mobile telephone 7. A lining composed of elastic material, for example TPE, is inserted into the lower shell. The lining follows the contours of the lower shell and thus defines the surface of the holding area 23. The material of the lining defines the base 24 and the circumferential side edge surface 25, which is intrinsically closed, which base 24 and edge surface 25 bound the holding area 23, which is in the form of a trough, at the bottom and at the side. In this case, the height of the edge surface is preferably constant over its profile and is large enough that mobile telephones with conventional dimensions do not project above the upper edge of the holding area 23 which is in the form of a trough, when they are arranged therein. The lower shell and/or the lining are/is preferably formed from electromagnetically shielding material. In particular, for example, the lining may be composed of a foam material which preferably has electromagnetically shielding characteristics.

The lining is shaped such that its material has a plurality of triangular projections 26a to 26m on the edge surface 25. The projections 26 are therefore likewise formed from elastic material. The projections 26 are distributed over the circumference of the holding area 23, but are preferably not uniformly distributed, that is to say adjacent projections are not at a constant distance from one another when viewed along the profile of the edge surface 25.

The projections are each arranged on an intrinsically linear section A-I of the edge surface 25. The linear sections A-I each run at an angle with respect to their two adjacent sections, thus resulting overall in the formation of nine corners between the sections A-I. Eight of the nine corners thereof are external corners. One of the corners, specifically the corner between the sections H and I is an internal corner, that is to say the angle measured within the holding area between the profile of the sections H and I is more than 180°. The sections H and I therefore form a concave profile of the edge surface 25. On the sections I and H, the concave profile merges into a single convex profile of the edge surface 25. This means that the profile of the edge surface is formed by a single concave section and a single convex section. However, configurations of the edge surface are also feasible which have more than one concave section.

The sections A, B, C and D run along a spiral line. This follows from the fact that the external corner between the sections A and B and the external corner between the sections B and C have approximately the same corner angle, with the sections A and B being of approximately the same length, but with the section C being longer. The section D, which is adjacent to the section C is once again of approximately the same length as the section C, although the angle of the corner between the sections C, D is greater than the angle between the sections B and C.

The sections E, F and G likewise run along a spiral line, but not the same spiral line as the sections A-D. The overall profile of the edge surface 25 is therefore formed by a concave section and two profile elements each approximately along a spiral line.

In the end, and in combination with the projections 26, this results in a multiplicity of different positions in which mobile telephones can be arranged in the holding area 23, in which case they rest in the respective position on the base 24 and at the same time on opposite sides on the edge surface 25. In some of these positions, which can also be referred to as held positions, because the mobile telephone can be held in this position, the respective mobile telephone even makes contact on a plurality of sides of points or sections of the edge surface 25.

Furthermore, the lining is composed of elastic material, which on the one hand makes it possible to create a clamping effect because of elastic forces and on the other hand also allows mobile telephones with slightly different dimensions to be held in the same position.

As FIG. 3 likewise shows, in addition to the holding area 23, which is in the form of a trough, for holding a mobile telephone, a relatively small holding area 31, which is in the form of a trough, can also be formed both in the lower shell and in the lining, in order, for example, to hold plugs or adaptors for connection of the mobile telephone.

FIG. 3 shows the outlines of three different mobile telephones 7a, 7b, 7c with different external dimensions. The mobile telephone 7b is longer than the mobile telephones 7a and 7c. The mobile telephone 7c (for example a PDA) is broader than the mobile telephones 7a and 7b.

In addition, the section f of the edge surface 25 has a cutout 32. Electrical contacts for electrical connection of the mobile telephone 7 that is held in the holding area 23 can be arranged in this cutout 32, for example a USB-A socket, onto which a charging plug can be plugged in order to charge the battery of the mobile telephone 7.

In other embodiments of the arrangement according to the invention, electrical contacts can be provided for other purposes and/or electrical contacts can be provided for different purposes. For example, contacts such these can be used to connect the mobile telephone to the connection for transmission of the antenna signal to the vehicle antenna.

Parts of an electrical circuit, for example a printed circuit board with appropriate components, can be arranged under the lower shell, that is to say between the lower shell and the base of the housing which, for example, is composed of metal. By way of example, the printed circuit board may have an antenna structure by means of which electromagnetic waves can be transmitted wirelessly between the mobile telephone 7 and the printed circuit board. The antenna structure may be a transmitting and/or receiving structure.

In one particular refinement, a cover can be articulated via a hinge at the end of the housing illustrated on the right in FIG. 3 and can be moved to a closed position of the housing by rotation about a rotation axis of the hinge. In the closed position, a foam material which is arranged on the lower face of the cover presses against the mobile telephone, which is arranged in the holding area 23 which is in the form of a trough, as a result of which this mobile telephone is additionally fixed in the holding area 23. The foam material is preferably designed such that it absorbs electromagnetic waves in the GHz range.

Figure 4:
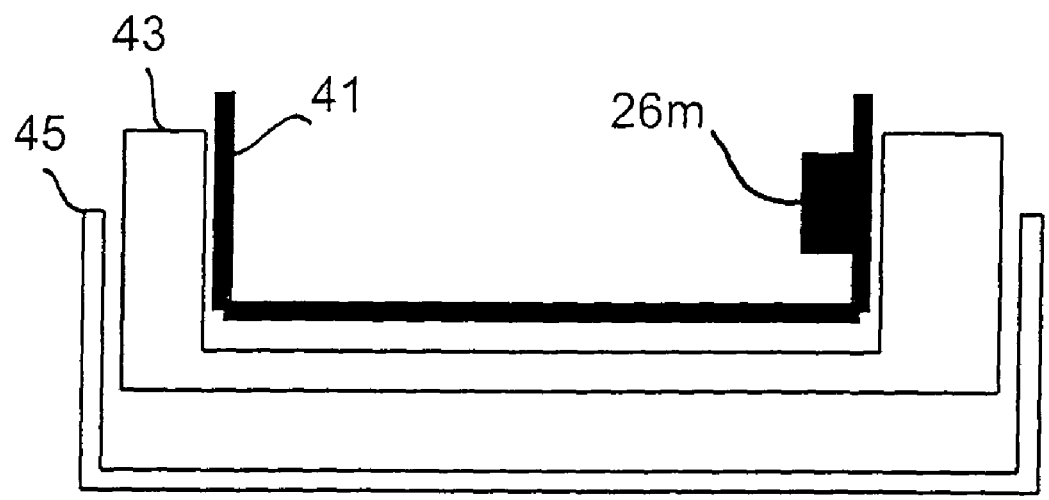
FIG. 4 shows a cross section along the line x-x in FIG. 3.

The illustration in FIG. 4 shows the cross section along the line x-x in FIG. 3, although the illustration should be considered to be schematic and not to scale. In addition, the illustration is in an exploded form, that is to say the three illustrated parts 41, 43, 45 are illustrated at a distance from one another in the vertical direction. In contrast, the three parts rest on one another in the operating state.

The housing is denoted by the reference symbol 45 in FIG. 4. It is preferably composed of metal (in particular metal sheet) and, in practical embodiments (as illustrated in FIG. 3), preferably has rounded corners. In a corresponding manner, the parts 41, 43 are preferably also provided with rounded areas, although these are not illustrated in FIG. 4.

The lower shell is annotated with the reference symbol 43. In contrast to the illustration in FIG. 4, its width corresponds to the width of the internal area of the housing 45, which means that it fits into the housing 45 without any play. The lower shell is a dimensionally stable part. The area which is surrounded by the outlines (illustrated by the lines in FIG. 4) of the lower shell can be completely or partially filled with the material of the lower shell.

The lining is annotated with the reference symbol 45 and is composed of TPE. The projections 26 are formed on the lining. The projection 26m can be seen on the right in the illustration. The lining also fits into the lower shell 43 without any play (in contrast to the illustration in FIG. 4).

Figure 5:
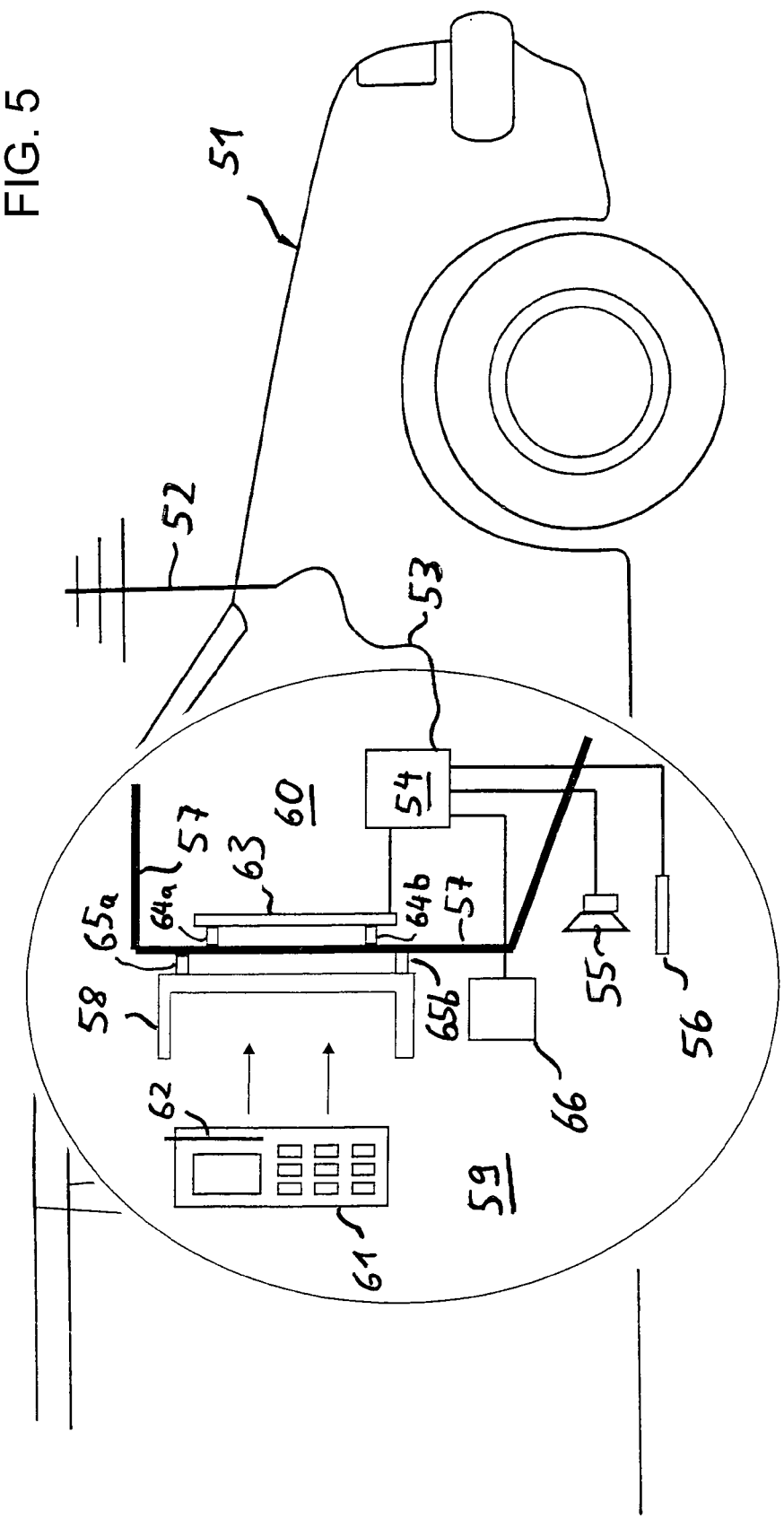
FIG. 5 shows, schematically, an area, illustrated enlarged, in a motor vehicle with an arrangement for coupling a mobile telephone to devices in the motor vehicle.

FIG. 5 shows parts of a side view of a passenger vehicle for operation on roads, with an arrangement for coupling a mobile telephone to devices in the motor vehicle being illustrated schematically, and enlarged, within an oval outline. The passenger vehicle 51 has an external antenna 52 via which, in particular, signals for operation of a mobile telephone in a mobile radio network can be transmitted and/or received. Alternatively or additionally, the antenna can also be used for transmission and/or reception of other signals, for example for reception of signals for finding the instantaneous position of the motor vehicle in a satellite-based position-finding system such as the GPS. However, different antennas may also be provided for the various types of signals.

In the exemplary embodiment shown in FIG. 5, the antenna 52 is connected via an antenna line 53 to a device 54 which is installed in the vehicle. Alternatively, however, the antenna can also be connected directly to an antenna structure in the interior of the vehicle, that is to say there is no need for the device 54.

In the exemplary embodiment, the device 54 is a unit of a hands-free system in order to make it possible for people in the vehicle to make telephone calls without having to hold the mobile telephone in their hands. The device 54 is therefore connected via a respective electrical connection to at least one loudspeaker 55 and to a microphone 56. When making a telephone call, the received voice signals are converted by the loudspeaker 55 to acoustic signals which can be heard in the vehicle interior, and sounds in the vehicle interior are received by the microphone 56, in such a way that corresponding signals can be transmitted to other subscribers in the mobile radio network. In this case, the device 54 can carry out the function of the mobile telephone directly, or can pass the signals received by the microphone 56 to the mobile telephone, and can pass signals received by the mobile telephone to the loudspeaker 55. In this case, the signals can also be processed. Furthermore, it is possible, in addition to the device 54, for other devices also to be involved in this, for example a stereo installation installed in the motor vehicle.

A broad line 57 indicates the edge of the vehicle interior in which people may be located during a journey. The device 54 is therefore located outside the area provided for people, since it is shown to the right of the line 57. The loudspeaker 55, the microphone 56 and a holder 58 for holding a mobile telephone are shown to the left of the line 57, and are located in the interior for people, which is annotated with the reference symbol 59. The area for the device 54 and further appliances is typically located between the control consoles for the vehicle driver and the engine bay of the vehicle, and is annotated with the reference symbol 60 in FIG. 5. A mobile telephone 61 with a mobile telephone antenna 62 can be held by the holder 58, or can be accommodated by it, as is indicated by two arrows pointing to the right. The antenna structure 63 for coupling the mobile telephone antenna 62 to devices in the motor vehicle, in particular to the device 54, is likewise arranged in the area 60, that is to say outside the passenger compartment 59. In the exemplary embodiment, the antenna structure 63 is connected via attachment elements 64a, 64b to the wall of the passenger compartment 59. The wall is symbolized by the line 57 in the illustration in FIG. 5. The holder 58 is connected to the wall via attachment elements 65a, 65b on one side of the wall, which is directly opposite the antenna structure 63.

This allows signals to be transmitted with low losses between the antenna structure 63 and the mobile telephone antenna 62, when the mobile telephone 61 is held by the holder 58. As will also be described, for example, with reference to FIG. 7, the antenna structure 63 may be a flat essentially two-dimensional structure, the normal surface of which extends approximately at right angles through the wall and meets the mobile telephone antenna 62 in a short distance between the antenna structure 63 and the mobile telephone antenna 62. The distance is, for example, less than 10 cm, preferably less than 5 cm. In this case, the mobile telephone antenna 62 is located, in particular, in the near field of the antenna structure 63, with respect to the highest cut-off frequency of the antenna structure 63 which, in particular, is equal to the highest frequency of the frequency ranges in which the antenna structure receives signals from the mobile telephone 61, or transmits them to it. The antenna structure 63 is in this case expediently arranged at a point on the wall of the passenger compartment 59 where the wall has no shielding effect, or at most a minor shielding effect for electromagnetic radiation. For example, the wall can be manufactured from plastic materials which are normally used in passenger vehicles these days.

In addition, an additional control part 66 for control of the device 54 and/or for control of the mobile telephone 61 may be located in the passenger compartment 59. By way of example, a subscriber connection via the mobile radio network can be set up and/or ended by operation of the control part 66. In this case, the control part 66 may also have a display device for visual display of information, for example a display for displaying the telephone number of a calling subscriber and/or for displaying other information. In addition, for example, address information and/or telephone number information stored in the device 54 or in the mobile telephone 61 can be called up and/or accessed via the control part 66. As indicated in FIG. 5, the control part 66 is connected to the device 54 via a connecting line.

In one preferred refinement, the arrangement which is illustrated in FIG. 5 and has already been described is operated, for example, as follows: after entering the motor vehicle 51, a user inserts his mobile telephone 61 into the holder 58, and switches on the mobile telephone 61. As an alternative to this, the mobile telephone 61 is already switched on. The antenna structure 63 receives signals which are transmitted by the mobile telephone antenna 62 and are transmitted via the line connection to the device 54. In this way, the device 54 recognizes that a mobile telephone has been coupled, passes the transmitted signals via the antenna line 53 to the external antenna 52, and thus starts to set up an additional Bluetooth radio link to the mobile telephone 61. The wireless connection between the antenna structure 63 and the mobile telephone antenna 62 is once again used for this Bluetooth link. The Bluetooth link can now be used for applications which are known per se, for example for controlling the mobile telephone 61 by operating the control part 66 and/or for connection of the mobile telephone 61 to the hands-free installation in the motor vehicle 51.

Figure 6:
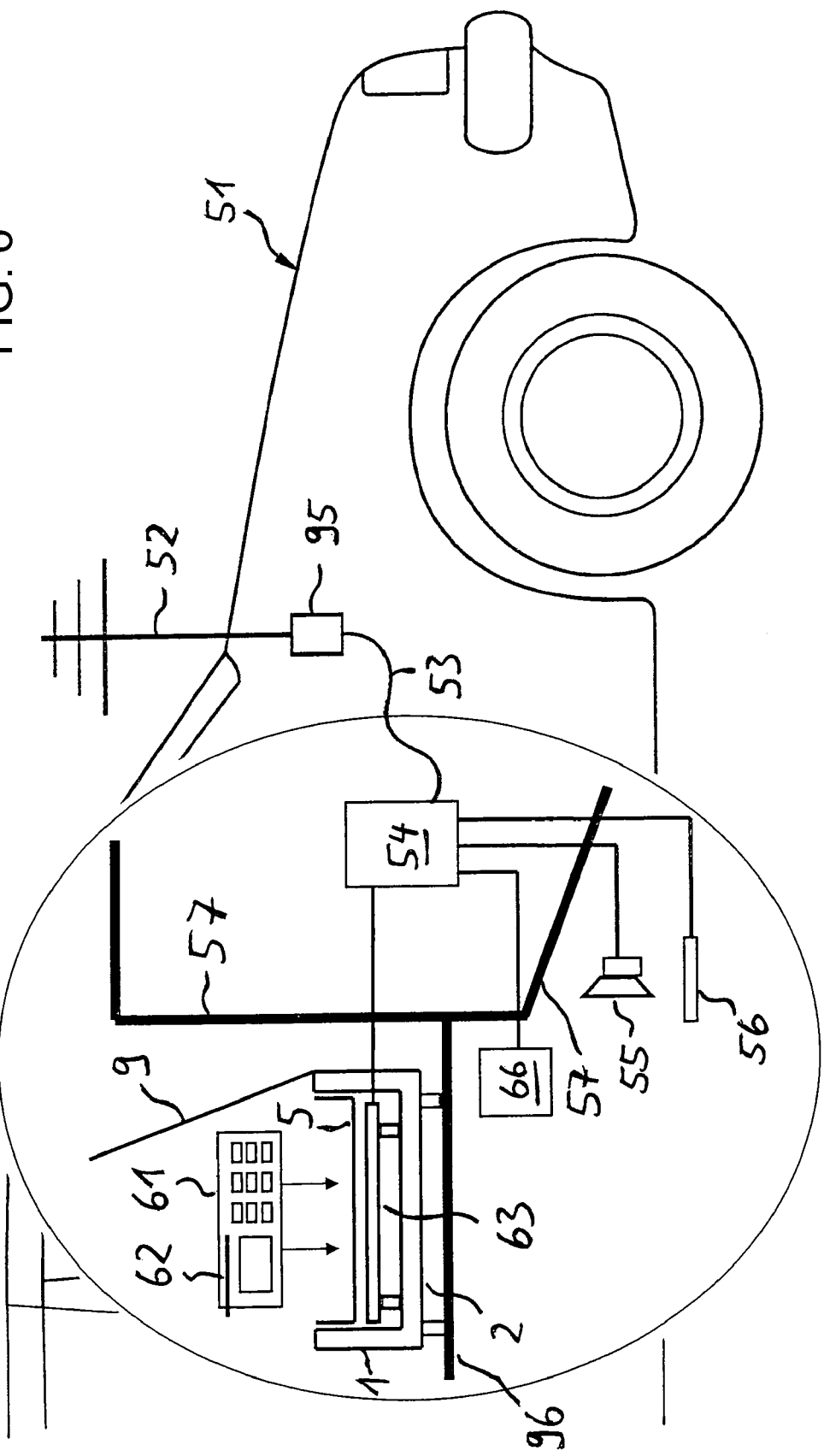
FIG. 6 shows, schematically, an area, illustrated enlarged, in a motor vehicle with a different arrangement for coupling a mobile telephone to devices in the motor vehicle.

FIG. 6 shows an alternative arrangement in the motor vehicle 51. Identical parts are in this case annotated with the same reference symbols as in FIG. 5, and will not be explained again.

In this embodiment, a housing 1 with a lower part 2 and a cover 9 is provided in order to hold the mobile telephone 61 and is arranged, for example, on a center console 96 between the front seats in a passenger vehicle, or is arranged integrated in the center console 96. By way of example, the housing 1 may be a refinement as has been described with reference to FIGS. 1 to 3.

The antenna structure 63 is arranged in the housing 1, for example between the insert part 5, which is in the form of a trough, and the base which is formed by the lower part 2.

In order to compensate for attenuation losses of the signals between the external antenna 52 and the mobile telephone 61, a compensator 95 is permanently installed in the vehicle, in this case in the vicinity of the external antenna 52. However, the compensator may also be integrated, for example, in the housing 1. In the embodiment shown in FIG. 5, it could be integrated in the holder 58 or in the device 54.

Independently of the specifically chosen embodiment of the holder or of the housing, an additional reflector can be used, particularly when using a two-dimensional antenna structure, in order to reduce the antenna losses by emission in the direction of the rear face of the antenna structure. The reflector reflects the waves emitted from the antenna structure towards the rear face (that is to say towards the side facing away from the mobile telephone), in the direction of the front face.

By way of example, the reflector may be arranged on the mount of the antenna structure, for example as an additional metallic layer as part of a board with more than two layers, in which electrically conductive areas are located. By way of example, the actual antenna structure is arranged in one of the layers, the supply line, as illustrated for example in FIG. 7, is arranged in a second layer, and the reflector is arranged in a third layer, located under this. However, the reflector may also be arranged as a separate component at a distance from the rear face of the antenna structure, for example as a metal plate which, in the case of the exemplary embodiment shown in FIG. 1 and FIG. 2, is arranged between the board 3 and the base of the lower part 2. Particularly in the case of a metallic housing, however, the housing base itself, for example base of the housing 2 shown in FIG. 1, may also act as a reflector.

The following text is intended to describe an advantage which is obtained when using an antenna structure which emits circular-polarized waves. This is the case in particular for antenna structures with spiral conductive and non-conductive areas, for example in the embodiment shown in FIGS. 7 and 8. Alternatively, linearly polarized waves may, however, also be produced, for example, by two linear, straight metallic areas, which are oriented rotated through 90° with respect to one another and are fed with a phase difference of 90°.

Antenna structures which produce circular-polarized waves and can therefore also receive waves which are linearly polarized in any desired direction, with high efficiency, are particularly suitable for holders or housings for holding mobile telephones which allow different orientations of the mobile telephone antenna. In particular, the holder shown in FIG. 3 can thus advantageously be combined with an antenna structure such as this.

Figure 9:
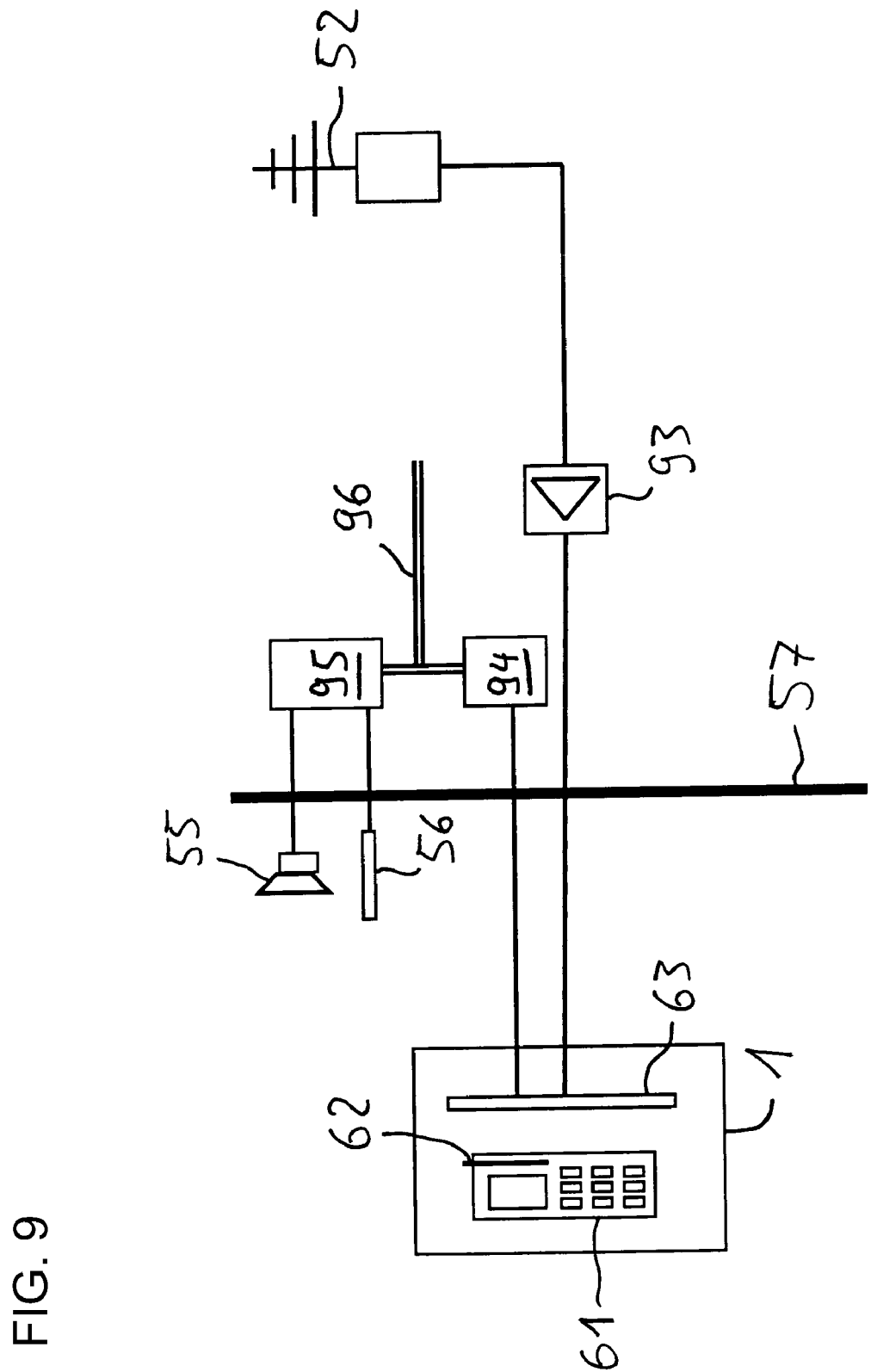
FIG. 9 shows, schematically, a further arrangement for coupling a mobile telephone to devices in the motor vehicle.

A further arrangement, which can be provided in a motor vehicle as an alternative to the arrangements illustrated in FIG. 5 and FIG. 6, is illustrated in FIG. 9. The same reference symbols once again denote the same or corresponding elements and units as in FIG. 5 and FIG. 6. The external antenna 52 of the motor vehicle is connected via an antenna feed directly to the antenna structure 63, although further devices, for example the illustrated amplifier 93 for amplification of the signals, may be provided in the antenna feed. However "directly" means that the device 54 from FIG. 5 and FIG. 6 is not arranged in the connection between the external antenna 52 and the antenna structure 63.

The signals which are received via the external antenna 52 are transmitted wirelessly from the antenna structure 63 to the mobile telephone antenna 62. In this case, the mobile radio network is preferably in the form of a WLAN. In a corresponding manner, the mobile telephone 61 is a mobile WLAN station. The transmission signals produced by the mobile telephone 61 are also transmitted (in the opposite direction) via the said connection to the external antenna 52, from where they are emitted.

The mobile telephone 61 is preferably designed to produce the voice signals required for hands-free operation within the motor vehicle, which voice signals can be transmitted, for example according to the Bluetooth Standard, via the coupling to the antenna structure 63 via a line connection to a device 94, from there via a data bus 96 of the motor vehicle to an audio device 95, and from there to a loudspeaker 55. In this case, the audio device 95 may also be omitted if the Bluetooth signals are converted to control signals for driving the loudspeaker 55 directly by the device 94. In a corresponding manner, a microphone 56 is connected to the audio device 95 or directly to the device 94. As in FIG. 5 and FIG. 6 as well, the boundary between the vehicle interior for accommodation of passengers is once again represented by a line 57. The passenger compartment is located to the left of the line 57 in the illustration in FIG. 9.

If the mobile radio network is in the form of an WLAN, the incoming voice signals can be transmitted in accordance with the IP Standard as VoIP signals (Voice over Internet Protocol). In the hands-free mode, the function of the mobile telephone can thus be restricted to the VoIP signals being converted from the WLAN to the Bluetooth Standard or to some other Standard used within the vehicle. Conversely, voice signals produced by the device 94 or by the audio device 95 can be transmitted via the antenna structure 63 to the mobile telephone 61, can be converted by it to WLAN, and can be transmitted via the external antenna 52.

Figure and FIG. 8 show one preferred embodiment of an antenna structure which has a mount 71, in the form of a plate, and spiral arm structures which are formed using stripline technology on one face (without any restriction to generality: the front face). The expression stripline technology means that areas which are in the form of strips and extend along the surface of the mount are composed of electrically conductive material on the surface of the mount structure (for example a plate), while other areas of the surface of the mount are not covered with electrically conductive material. For example, the mount may be fitted with a layer of metal on its surface, which layer has a uniform thickness and extends over the entire surface on the front face. By way of example, those areas which are intended to be free of electrically conductive material can then be demetalized in order to produce the stripline structure, for example using etching materials or by grinding and polishing. The electrically conductive areas may, however, also alternatively be applied on a locally selective basis.

By way of example, the mount 71 is produced from glass-fiber-reinforced epoxy resin, as is normal practice for electrical and electronic circuits using printed circuit board technology. Alternatively, however, the mount may also be composed of any other dielectric material, for example ceramic or polytetrafluoroethylene mixed with ceramic powder.

The structure illustrated in FIG. 7 has an uninterrupted area 75 which is formed by the electrically conductive layer. The areas which are free of electrically conductive material are in the form of two spiral arms and are annotated with the reference symbols 73, 74, with the areas 73, 74 being connected to one another at the center of the spirals by a transitional area 76 (FIG. 8). Areas 75a, 75b which are part of the area 75 and are complementary to the areas 73, 74 accordingly extend to the center of the spiral, but are electrically isolated from one another there by the transitional area 76. The spiral arms 75a, 75b are therefore electrically connected to one another only via the outer area of the area 75.

As is illustrated by a shaded spiral arm in FIG. 7 and FIG. 8, a supply line area 77 consisting of electrically conductive material extends on the rear face of the mount 71. The supply line area 77 is therefore once again in the form of a strip. This strip runs directly opposite one of the metallic spiral arms 75a or 75b, in this case opposite 75a. The strip 77 extends to the center of the spiral, but crosses over the area there which is immediately opposite the transitional area 76 (FIG. 8). In the illustrated exemplary embodiment, the strip 77 is electrically connected at the center to a connection 78 which extends through the material of the mount 71 and electrically connects the strip 77 to the center end of the spiral arm 75b.

As an alternative to this, the feedthrough 78 may be omitted and the strip 77 may instead of this extend further over the rear face of the transitional area 76, following the rear face of the spiral arm 75b, but ending approximately after an extent which corresponds to a 180° curvature around the center of the spiral.

As can be seen from FIG. 7, the width of the spiral arm 77 of the supply line changes in its profile from the center of the spiral to the edge of the mount 71 where, for example, it is electrically conductively connected to the center conductors of coaxial cables 88a, 88b.

In this case, the shield of the coaxial cable is electrically connected to the electrically conductive area 75. The step-like change in the width of the profile of the spiral arm 77 results in the impedance being matched to the desired connected load value of the antenna structure. For example, if a connected load value of 50 Ohms is desired, but the impedance without matching is 120 Ohms, the step-like change in the width leads to the desired matching. The matching can also be referred to as impedance transformation. In order to achieve optimum matching, the distance between the steps 79a, 79b (the distance is not measured linearly but corresponding to the profile of the spiral arm 77, along the curvature), is chosen such that it is equal to one quarter of the wavelength of the mid-frequency of the frequency range in which the antenna structure is intended to operate with a broad bandwidth.

It is assumed that $Z_2$ is the impedance which is intended to be transformed (without matching) and $Z_1$ the impedance which is intended to be matched to (desired connected load). In the case of single-stage transformation, the impedance $Z_T$ of the transformation waveguide which has a length equal to one quarter of the wavelength is $Z_T = \sqrt{Z_1 \cdot Z_2} = \sqrt{50\Omega \cdot 120\Omega} \approx 77\Omega$. Then, for the two-stage and geometrically stepped transformation used in this case with the two transformation waveguides $Z_{T1}$ and $Z_{T2}$ which have a length of one quarter of the wavelength, $$Z_{T1} = Z_1 \sqrt[4]{\frac{Z_2}{Z_1}} = 50\Omega \cdot \sqrt[4]{\frac{120}{50}} \approx 66.9\Omega$$

and $$Z_{T2} = Z_{T1} \sqrt[4]{\frac{Z_2}{Z_1}} = 66.9\Omega \cdot \sqrt[4]{\frac{120}{50}} \approx 89.6\Omega$$

In this context, cf, Zinke, O.; Brunswig, H. Iobrbuch der Hochfrequenztechnik. [the textbook of Radio Frequency technology] Berlin, Heidelberg, New York, Tokyo: 1986 (3rd edition), volume 1, page 97.

As an alternative to impedance matching by means of the described, step-like width changes, the spiral arm of the connecting line may have a profile which becomes continuously broader in the outward direction as well, from the center of the spiral. This also allows impedance matching to be carried out.

In one preferred refinement, the antenna structure has a diplexer (for example 72 in FIG. 7), which is preferably fitted to the same mount, likewise using stripline technology, with this being the mount to which the actual antennas are fitted. For example, the spiral arm 77 is connected at its outer end, looking from the spiral center, to a diplexer formed in this way. The diplexer is used to distribute frequency signals which are in different frequency ranges between two different, or even more than two different, connecting lines. The connecting lines are, for example, each formed by a coaxial cable 88*a*, 88*b*. For example, two connecting lines are provided and the diplexer splits signals in the region of the frequency band for Bluetooth from signals in the region of a GSM frequency band.

The diplexer 72 is preferably a duplexer, that is to say it not only splits the frequencies between the connecting lines corresponding to frequency signals received by the antenna structure but also allows transmission signals to be supplied via the connecting lines in order that they can be transmitted by the antenna structure. In this case, the diplexer combines the signals which are supplied via the various connecting lines of the antenna structure.

The diplexer can also be used exclusively for the transmission mode.

As an alternative to the described refinement of the diplexer using stripline technology, it is also possible to use commercially available, separate components which, for example, are attached to the mount of the antenna structure or which are attached to another holder. In this case, the diplexer may be formed, for example, from a suitable combination of bandpass filters.

In order to compensate for attenuation losses in the wireless transmission of the signals between the antenna structure and the mobile telephone antenna (including the capability to carry out additional amplification), an amplifier is preferably provided, which amplifies the signals on the path from the antenna structure to other devices, for example to an external antenna of the motor vehicle or to a hands-free device in the motor vehicle. Alternatively or additionally, an amplifier can be provided which amplifies the transmission signals on their path to the antenna structure. The amplifier or amplifiers is or are, for example, part of the arrangement for transmission of the antenna signals to and/or from the mobile telephone antenna. By way of example, the amplifier or amplifiers is or are mechanically connected to the holder for holding and/or accommodating the mobile telephone. For example, the amplifier can be attached to the board 3 shown in FIG. 1.

Figure 10:
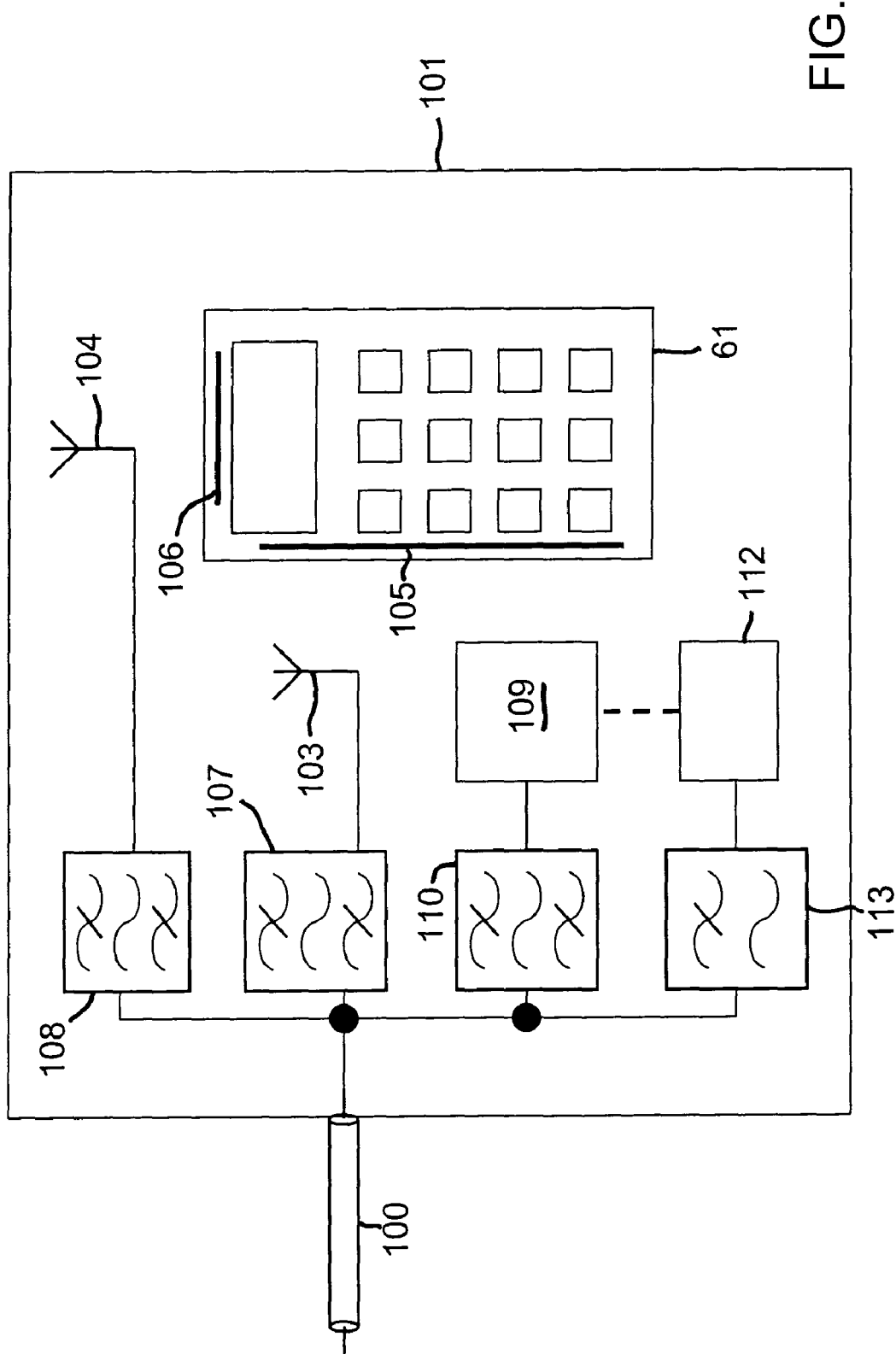
FIG. 10 shows a first arrangement of frequency filters and devices of a holder for a mobile telephone.

A spiral antenna structure can also be constructed and electrically connected differently to that described with reference to FIG. 7. Examples of this are described in U.S. Pat. No. 5,621,422. As is described in more detail there, the existing two spiral arms can be electrically connected at their outer ends and are connected via a so-called 180° hybrid, which once again allows the connection of connecting lines for signals in different frequency bands (as illustrated in FIG. 9 and FIG. 10 of U.S. Pat. No. 5,621,422, and as described in the associated description in columns 10 and 11).

Figure 11:
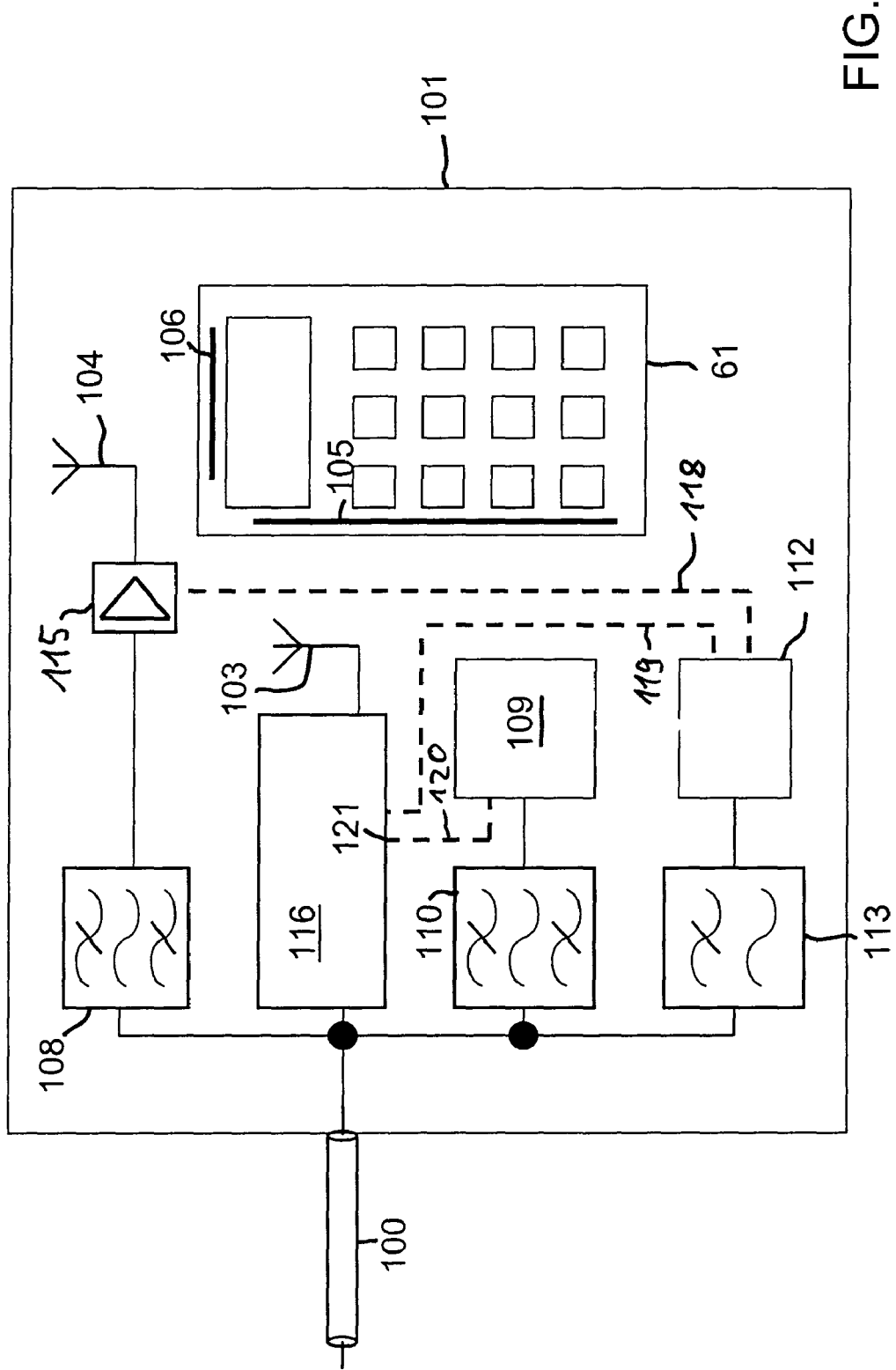
FIG. 11 shows a second arrangement of frequency filters and devices for a mobile telephone holder.
Figure 12:
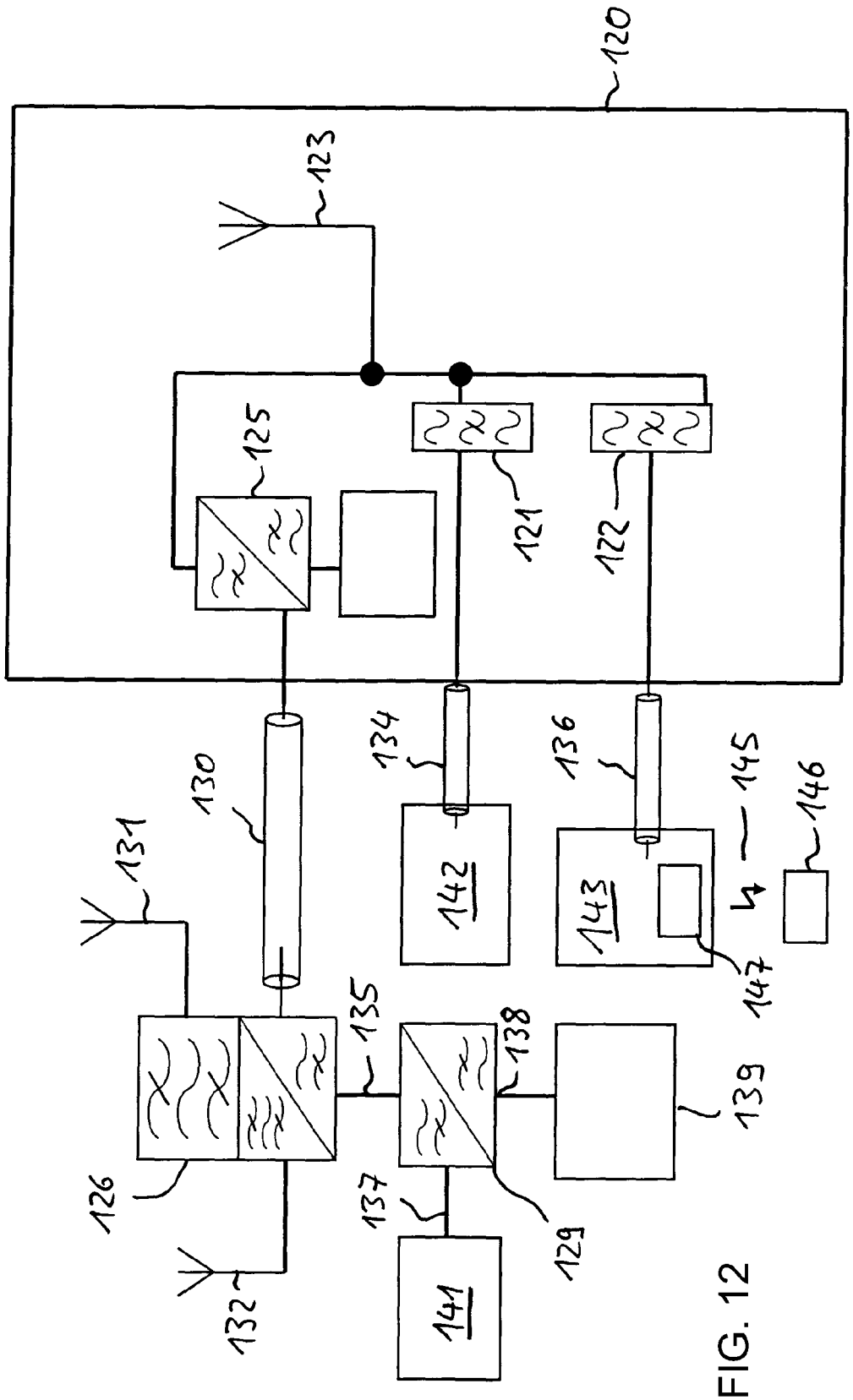
FIG. 12 shows an entire arrangement of devices in a motor vehicle, with a third arrangement of filter devices and different devices of a mobile telephone holder.

FIGS. 10 to 12 will be described in the following text. In this case, the same reference symbols once again denote the same or corresponding components to those in the other figures. FIG. 10 shows a holder 101 which is in the form of an electromagnetically shielding housing for holding a mobile telephone 61. The holder 101 has a first antenna 103 for transmission of signals of a mobile radio network (for example GSM or UMTS, or WLAN) to a first mobile telephone antenna 105, and for receiving such signals. Furthermore, a second antenna 104 of the holder 101 is provided and is used to transmit signals of a position-finding system (for example GPS) to a second mobile telephone antenna 106. The first antenna 103 is connected via a bandpass filter 107 to a connecting line 100 of the holder 101, with the connecting line being, for example, a coaxial cable which connects the holder 101 to an external antenna on the motor vehicle. The second antenna 104 is likewise connected to the connecting line 100 via a further bandpass filter 108.

Furthermore, the holder has a device 109 which is used to carry out control, monitoring and/or diagnosis functions on devices and components installed in the vehicle. One example has already been described and relates to the temperature monitoring of a refrigerator container in the motor vehicle. The device 109 is in turn connected to the connecting line 100 via a further bandpass filter 110.

Furthermore, the holder 101 has a power supply device 112 which, for example, has a rechargeable battery with associated charging electronics, as well as connections for components and devices to be supplied in the holder 101. This power supply device 112 is likewise connected to the connecting line 100 via a low-pass filter 113. Thus, for example in the case of the coaxial cable, the center conductor of the cable is connected to the bandpass filters 107, 108 and 110, and to the low-pass filter 113.

This allows the mobile telephone 61 to receive GPS position signals and also, via the wireless connection to the first antenna 103, to receive radio signals from a mobile radio network, and to transmit radio signals into this network. Furthermore, the power supply for devices and components in the holder 101 can be ensured via the connecting line 100, for example for the device 109 or any other devices which are not illustrated in FIG. 10, for example a signal amplifier for amplification of the radio-frequency signals to be transmitted via the connecting line 108, a display or illuminated control elements on the holder 101.

The holder preferably has a device for inductive (wireless) charging of an energy store which is part of the mobile telephone. This charging device can also be supplied with electrical power in order to charge the mobile telephone, via a power supply, as described above. The expression inductive charging means that energy is transmitted in the form of electromagnetic waves to the mobile telephone, where it is received, for example, by a coil (in a more general form: an antenna), and is introduced into the energy store.

In order to return to the exemplary embodiment shown in FIG. 10, the function of the device 109 may be independent of the mobile telephone 61. However, if specific events occur, for example if it is found that the temperature in the freezing container is rising, it is preferable for the device 109 to transmit a signal to the mobile telephone 61 via a further antenna, which is not illustrated, of the holder 101 or via the signal path a) bandpass filter 110, b) bandpass filter 107 and c) first antenna 103, which signal causes the mobile telephone 61 to react, for example to transmit signals via the mobile radio network.

The antennas 103, 104 are parts of a physically distributed antenna structure of the holder 101. This shows that the antenna structure need not necessarily be one physical unit, although it preferably is one physical unit. The antenna variant illustrated in FIG. 10 was chosen since the position signals which are incident in the open air during normal use of the mobile telephone 61, and/or incident and emitted mobile radio signals, typically propagate in different solid angle ranges from the point of view of the mobile telephone 61. The mobile telephone antennas 105, 106 therefore have mutually different directional characteristics and are arranged at points at a distance from one another in the mobile telephone 61.

FIG. 11 shows a variant of the arrangement from FIG. 10, but with signal amplifiers 115, 116 being provided. A first amplifier 115 is arranged in the connection between the bandpass filter 108 and the second antenna 104, and is used to amplify position signals which are passed via the connection line 100 to the bandpass filter 108 through which they are passed and are intended to be sent to the mobile telephone 61 via the second antenna 104.

Furthermore, the bandpass filter 107 from FIG. 10 is replaced by a compensator 116 which, in addition to the function of bandpass filtering for the frequencies of the mobile radio network, also carries out signal amplification. In this case, both the signals which are received from the mobile telephone 61 via the first antenna 103 and the signals to be transmitted to the mobile telephone 61 by the first antenna 103 are amplified. Furthermore, power supply connections 118, 119 and 120 are illustrated, which connect the power supply device 112 to the amplifier 115, to the compensator 116 and (via an auxiliary output 121 of the compensator 116) to the device 109.

FIG. 12 shows a holder 120 for holding a mobile telephone (not illustrated). The holder 120 may once again be an electromagnetically externally shielded housing. In this embodiment, a single antenna 123 is provided, in order to transmit radio signals to the mobile telephone and to receive radio signals from it. The antenna is connected via a diplexer 125 to a first connecting line 130 for connecting the holder 121 to devices in the motor vehicle. In the exemplary embodiment, these devices comprise a further diplexer 126 to which a first external antenna 131 for receiving position signals is connected and to which a second external antenna 132 for a radio link within a mobile radio network is connected. Furthermore, a further diplexer 129 is connected to the diplexer 126 via a line connection 135, to which further diplexer 129 a power supply device 139 of the motor vehicle is in turn connected (audio-frequency or DC voltage connection 138 of the diplexer 129) and to which further devices in the motor vehicle are connected, for example via a databus 137 (for example a CAN bus) which, in the example, are annotated overall with the reference symbol 141. By way of example, the devices 141 may be control, monitoring and/or diagnosis devices which are used for driving operation of the motor vehicle.

The antenna 123 of the holder 120 is also connected via a first frequency filter 121 to a second connecting line 134 of the holder 120. By way of example, WLAN or Bluetooth signals are transmitted via this connecting line 134 to audio, video, multimedia, control and/or telematics devices in the motor vehicle. In particular, these include a hands-free installation, a stereo installation and/or a navigation system. These devices are annotated overall with the reference symbol 142.

The antenna 123 is connected via a second frequency filter 122 to a third connecting line 136 of the holder 120. By way of example, signals in one or more different frequency bands for so-called ISM systems (industrial scientific medical) in the motor vehicle are transmitted via this connecting line 136 to devices which, in the example, are annotated overall with the reference symbol 143. An ISM frequency band is a frequency range for radio-frequency transmission appliances in industry, science and medicine, which is not subject to national regulation and may be used without any license. All that is necessary is to comply with requirements relating to the transmission power and the interference between adjacent frequency ranges, and to have the appliances appropriately tested by specialists.

By way of example, the devices 143 may be control, monitoring and/or diagnosis devices which are not used for driving operation of the motor vehicle but for additional functions such as monitoring and controlling freight containers or for monitoring the fitness of the driver to drive. By way of example, the device 143 is an active transponder which is connected via a radio interface 145 to a temperature sensor 146 in a refrigerator container. In order to allow the history of the temperature signals produced by the temperature sensor 146 to be recorded, the transponder 143 has a data memory 147. As soon as a mobile telephone is held in the holder 120 and is coupled via the antenna 123, the frequency filter 122 and the connecting line 136 to the transponder 143, the mobile telephone calls up the history in the form of stored temperature values and determines, for example, whether a maximum permissible temperature has been exceeded in the refrigerator container. If this is the case, the mobile telephone automatically sends a message to a mobile radio network subscriber via the antenna 123, the diplexer 125, the connecting line 130, the diplexer 126 and the external antenna 132.

In a corresponding manner, the mobile telephone may also be a monitoring and/or evaluation device for other ISM functions which are present in the motor vehicle. This has the advantage that it can provide radio communication, that is dependent on monitoring and/or evaluation, via the mobile radio network.

By way of example, the connecting lines 130, 134, 136 may be coaxial cables.

The invention claimed is:

1. An arrangement for coupling a mobile telephone antenna to a device including at least one of an external antenna of a motor vehicle and a hands-free device of a motor vehicle, comprising:
   said telephone antenna being at least one of a transmitting and receiving antenna of a mobile telephone;
   an antenna structure for wireless transmission of signals relative to and/or from a transmitting and/or receiving antenna of the mobile telephone;
   a holder for at least limiting movement of the mobile telephone;
   said holder being constructed for holding the same mobile telephone type within a local area defined by said holder in any given holding positions and for holding different mobile telephones types, said holder including a holding area being in the form of a trough for holding the mobile telephone, said holding area having a bottom and a self-contained circulating lateral edge surface, said bottom defining a support surface for placement of the mobile telephone; and
   said antenna structure being constructed and arranged relative to said holder such that, in every holding position, a wireless signal transmission occurs between said antenna of the held mobile telephone and said antenna structure.

2. The arrangement according to claim 1, wherein said antenna structure couples the transmitting and/or receiving antenna of the mobile telephone to an external antenna of the motor vehicle and the wireless coupling of the mobile telephone to a hands-free device of the motor vehicle.

3. The arrangement according to claim 1, wherein said antenna structure emits circular-polarized waves.

4. The arrangement according to claim 1, wherein said antenna structure has spiral electrically conductive areas.

5. The arrangement according to claim 4, wherein said antenna structure has a feed point located substantially in the center of and connected to said spiral conductive areas.

6. The arrangement according to claim 1, wherein said holder includes an electromagnetically shielding housing having an opening to insert the mobile telephone into said housing and to remove the mobile telephone from said housing, and said antenna structure is arranged in said electromagnetically shielding housing.

7. The arrangement according to claim 1, wherein said holder is constructed to hold said mobile telephone with said telephone antenna located in the near field of said antenna structure.

8. The arrangement according to claim 1, wherein said holder is a part of an electromagnetically shielding housing for holding the mobile telephone, said electromagnetically shielding housing having an opening for insertion and removal of the telephone and including a cover for closing said opening.

* * * * *